(12) United States Patent
Wang et al.

(10) Patent No.: US 12,287,945 B2
(45) Date of Patent: Apr. 29, 2025

(54) TOUCH SUBSTRATE AND DISPLAY DEVICE

(71) Applicants: Chengdu BOE Optoelectronics Technology Co., Ltd., Sichuan Province (CN); BOE Technology Group Co., Ltd., Beijing (CN)

(72) Inventors: Yu Wang, Beijing (CN); Fan He, Beijing (CN); Peng Xu, Beijing (CN)

(73) Assignees: Chengdu BOE Optoelectronics Technology Co., Ltd., Sichuan Province (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/679,116

(22) Filed: May 30, 2024

(65) Prior Publication Data

US 2024/0319834 A1    Sep. 26, 2024

Related U.S. Application Data

(63) Continuation of application No. 18/455,737, filed on Aug. 25, 2023, now Pat. No. 12,045,429, which is a
(Continued)

(30) Foreign Application Priority Data

May 15, 2020   (CN) .................. 202010414660.X
Jun. 22, 2020   (CN) .................. 202010576852.0

(51) Int. Cl.
   *G06F 3/044* (2006.01)
   *G06F 3/041* (2006.01)

(52) U.S. Cl.
   CPC .......... *G06F 3/0446* (2019.05); *G06F 3/0412* (2013.01); *G06F 2203/04111* (2013.01); *G06F 2203/04112* (2013.01)

(58) Field of Classification Search
   None
   See application file for complete search history.

(56) References Cited

U.S. PATENT DOCUMENTS

2014/0144679 A1   5/2014  Hwang et al.
2015/0193035 A1   7/2015  Ullmann et al.
(Continued)

FOREIGN PATENT DOCUMENTS

CN    203773525 U    8/2014
CN    105912181 A    8/2016
(Continued)

OTHER PUBLICATIONS

USPTO, Notice of Allowance, U.S. Appl. No. 17/418,198, mailed Jun. 7, 2023, 8 pages.
(Continued)

*Primary Examiner* — Nicholas J Lee
(74) *Attorney, Agent, or Firm* — Workman Nydegger

(57) ABSTRACT

Disclosed are a touch substrate and a display device. The touch substrate includes a touch electrode layer with a mesh type structure; the touch electrode layer includes the first touch electrode including first touch sub-electrodes, and the second touch electrode including second touch sub-electrodes; each first touch sub-electrode includes first touch electrode meshes, and each second touch sub-electrode includes second touch electrode meshes; the touch electrode layer further includes boundary meshes located between adjacent first touch sub-electrode and second touch sub-electrode; each boundary mesh includes at least two first mesh lines; each first mesh line is provided with a first break; second mesh lines are arranged in a first touch electrode mesh and/or a second touch electrode mesh; the second
(Continued)

mesh lines are provided with second breaks; and a pattern shape of the first mesh line and a pattern shape of the second mesh line are different.

20 Claims, 13 Drawing Sheets

Related U.S. Application Data continuation of application No. 17/418,198, filed as application No. PCT/CN2020/126577 on Nov. 4, 2020, now Pat. No. 11,782,563.

(56) References Cited

U.S. PATENT DOCUMENTS

| | | |
|---|---|---|
| 2015/0317010 A1 | 11/2015 | Yashiro et al. |
| 2017/0010720 A1 | 1/2017 | Nakayama |
| 2019/0004638 A1 | 1/2019 | Lee et al. |
| 2019/0258338 A1 | 8/2019 | Park |
| 2020/0064958 A1 | 2/2020 | Jun et al. |
| 2020/0159353 A1 | 5/2020 | Xie et al. |
| 2020/0183538 A1 | 6/2020 | Li et al. |
| 2021/0043872 A1 | 2/2021 | Gao |
| 2021/0208739 A1 | 7/2021 | Li et al. |
| 2021/0311589 A1 | 10/2021 | Ye |
| 2021/0365154 A1 | 11/2021 | Li |
| 2022/0113838 A1 | 4/2022 | Xu et al. |

FOREIGN PATENT DOCUMENTS

| | | |
|---|---|---|
| CN | 106170751 A | 11/2016 |
| CN | 107239181 A | 10/2017 |
| CN | 107463296 A | 12/2017 |
| CN | 107957821 A | 4/2018 |
| CN | 109213369 A | 1/2019 |
| CN | 109240533 A | 1/2019 |
| CN | 109669572 A | 4/2019 |
| CN | 110162214 A | 8/2019 |
| CN | 110429207 A | 11/2019 |
| CN | 110442259 A | 11/2019 |
| CN | 110489014 A | 11/2019 |
| CN | 110764636 A | 2/2020 |
| CN | 111736726 A | 10/2020 |
| JP | 2018018320 A | 2/2018 |
| TW | 201602854 A | 1/2016 |
| WO | 2020020027 A1 | 1/2020 |

OTHER PUBLICATIONS

USPTO, Non-Final Office Action, U.S. Appl. No. 17/418,198, mailed Feb. 13, 2023, 16 pages.

International Search Report and Written Opinion, China International Search Authority, App. No. PCT/CN2020/126577, mailed Feb. 20, 2021, 16 pages.

European Extended Search Report, App. No. 20935860.5, mailed Nov. 30, 2022, 10 pages.

Chinese Second Office Action, App. No. 202010576852.0, mailed Mar. 28, 2022, 14 pages.

Chinese First Office Action, App. No. 202010576852.0, mailed Oct. 11, 2021, 17 pages.

Chinese Decision of Rejection, App. No. 202010576852.0, mailed Nov. 9, 2022, 18 pages.

Chinese Notice of Allowance, App. No. 202010414660.X, mailed Jan. 22, 2024, 7 pages.

USPTO, Notice of Allowance, U.S. Appl. No. 18/455,737, mailed Mar. 13, 2024, 19 pages.

TOUCH SUBSTRATE AND DISPLAY DEVICE

CROSS REFERENCE TO RELATED APPLICATIONS

The present disclosure is a continuation application of U.S. patent application Ser. No. 18/455,737, filed on Aug. 25, 2023, which is a continuation application of U.S. patent application Ser. No. 17/418,198, filed on Nov. 4, 2020, which is a US National Stage of International Application No. PCT/CN2020/126577, filed Nov. 4, 2020, which claims the priorities to Chinese Patent Application No. 202010414660.X filed on May 15, 2020 and entitled "Touch Substrate and Display Device", and Chinese Patent Application No. 202010576852.0 filed on Jun. 22, 2020 and entitled "Touch Substrate and Touch Display Device", the disclosures of which are incorporated by reference herein in their entireties as part of the present disclosure.

FIELD

The embodiments of the present disclosure relate to, but are not limited to, the field of displaying and touching, and particularly relate to a touch substrate and a display device.

BACKGROUND

With the rapid development of the active-matrix organic light-emitting diode (AMLOED) display industry, display devices are also developing toward narrow bezels, light-weight and thinness. At present, the use of a flexible multi layer on cell (FMLOC) technology can better achieve these high needs. During design of a display device using the FMLOC technology, a touch structure layer is directly fabricated on stacked light-emitting structure layer and package layer to reduce the use of an optically clear adhesive (OCA), does not need to be connected by driving a touch flexible printed circuit (TFPC), and can well realize light-weight and thinness of a product.

In the design process of a touch substrate, there are many process and technology problems, which result in many poor touches. In the fabrication process of the touch structure layer, short circuits (short) between metal routes in the touch structure layer caused by metal remain in a display region after etching accounts for the largest proportion. In some technologies, a driving electrode (Tx) and an induction electrode (Rx) in the touch structure layer are in the form of metal mesh. A detection device cannot determine a specific position of poor touch when detecting the poor touch in the touch structure layer, so that the poor touch cannot be repaired in time, and the improvement of the yield of products is affected.

SUMMARY

Embodiments of the present disclosure provide a touch substrate, including a base substrate and a touch electrode layer located on the base substrate;

the touch electrode layer is of a mesh type structure including lead wires; the touch electrode layer includes a plurality of first touch electrodes extending in a first direction and a plurality of second touch electrodes extending in a second direction; the first direction and the second direction intersect;

each first touch electrode includes a plurality of first touch sub-electrodes arranged in the first direction, and each second touch electrode includes a plurality of second touch sub-electrodes arranged in the second direction; each first touch sub-electrode includes a plurality of first touch electrode meshes, and each second touch sub-electrode includes a plurality of second touch electrode meshes;

the touch electrode layer further includes a plurality of boundary meshes located between adjacent first touch sub-electrode and second touch sub-electrode; each boundary mesh includes at least two first mesh lines; each first mesh line is provided with a first break; first breaks in the plurality of boundary meshes are configured to enable adjacent first touch sub-electrode and second touch sub-electrode to be insulated from each other; second mesh lines are arranged in a first touch electrode mesh and/or a second touch electrode mesh; the second mesh lines are provided with second breaks;

the first mesh line includes a first break and a first broken line; the first break breaks the first mesh line to form the first broken line; and the second mesh line includes a second break and a second broken line; the second break breaks the second mesh line to form the second broken line;

a spacing width of the first break is different from a spacing width of the second break; and the spacing width of the first break is greater than the spacing width of the second break; and a pattern shape of the first mesh line and a pattern shape of the second mesh line are different.

In some embodiments, the plurality of second breaks enclose at least one dummy region within a region where the first touch electrode and/or the second touch electrode is located, and the at least one dummy region is insulated from the first touch electrode and the second touch electrode.

In some embodiments, a size and/or shape of an end part of the first mesh line is different from a size and/or shape of an end part of the second mesh line.

In some embodiments, sizes of two end parts of the second mesh line are the same; and a size of at least one end part of the first mesh line is greater than the size of the end part of the second mesh line.

In some embodiments, sizes of two end parts of the first mesh line are greater than the sizes of two end parts of the second mesh line.

In some embodiments, a cross-sectional shape of an end of the first broken line close to the first break is different from a cross-sectional shape of an end of the second broken line close to the second break; and a cross section of the end of the first broken line close to the first break is non-rectangular, and a cross section of the end of the second broken line close to the second break is rectangular.

In some embodiments, the cross section of the end of the first broken line close to the first break is fan-shaped or T-shaped.

In some embodiments, a length of the first broken line is different from a length of the second broken line;

the first mesh line includes one first break and two first broken lines respectively located at two ends of the first break, and the two first broken lines are different in length; and the second mesh line includes one second break and two second broken lines respectively located at two ends of the second break, and the two second broken lines are the same in length.

In some embodiments, the two second broken lines are symmetrically arranged relative to a centerline of the second break.

In some embodiments, a quantity of the first broken lines in the first mesh line is different from a quantity of the second broken lines in the second mesh line;

the first mesh line includes one first break and one first broken line located at one end of the first break; and the second mesh line includes one second break and two second broken lines respectively located at two ends of the second break.

Embodiments of the present disclosure provide a display device, including: a base; a driving circuit layer on the base; a light-emitting structure layer on a side of the driving circuit layer facing away from the base, a package layer on a side of the light-emitting structure layer facing away from the base, and a touch substrate on a side of the package layer facing away from the base;

where the touch substrate includes: a base substrate and a touch electrode layer located on the base substrate;

the touch electrode layer is of a mesh type structure including lead wires; the touch electrode layer includes a plurality of first touch electrodes extending in a first direction and a plurality of second touch electrodes extending in a second direction; the first direction and the second direction intersect;

each first touch electrode includes a plurality of first touch sub-electrodes arranged in the first direction, and each second touch electrode includes a plurality of second touch sub-electrodes arranged in the second direction; each first touch sub-electrode includes a plurality of first touch electrode meshes, and each second touch sub-electrode includes a plurality of second touch electrode meshes;

the touch electrode layer further includes a plurality of boundary meshes located between adjacent first touch sub-electrode and second touch sub-electrode; each boundary mesh includes at least two first mesh lines; each first mesh line is provided with a first break; first breaks in the plurality of boundary meshes are configured to enable adjacent first touch sub-electrode and second touch sub-electrode to be insulated from each other; second mesh lines are arranged in a first touch electrode mesh and/or a second touch electrode mesh; the second mesh lines are provided with second breaks;

the first mesh line includes a first break and a first broken line; the first break breaks the first mesh line to form the first broken line; and the second mesh line includes a second break and a second broken line; the second break breaks the second mesh line to form the second broken line;

a spacing width of the first break is different from a spacing width of the second break; and the spacing width of the first break is greater than the spacing width of the second break; and a pattern shape of the first mesh line and a pattern shape of the second mesh line are different.

BRIEF DESCRIPTION OF THE DRAWINGS

FIG. 2-1 to FIG. 2-5 are respectively schematic structural diagrams of a metal mesh of a touch structure layer in some exemplary embodiments.

FIG. 3 is a schematic structural diagram of a touch structure layer in the form of metal mesh in some exemplary embodiments.

FIG. 4-1 to FIG. 4-3 are respectively schematic structural diagrams of a pixel unit in some exemplary embodiments.

FIG. 5 is a schematic diagram of a sectional structure of a display structure layer in some exemplary embodiments.

DETAILED DESCRIPTION OF THE EMBODIMENTS

Figure 1:
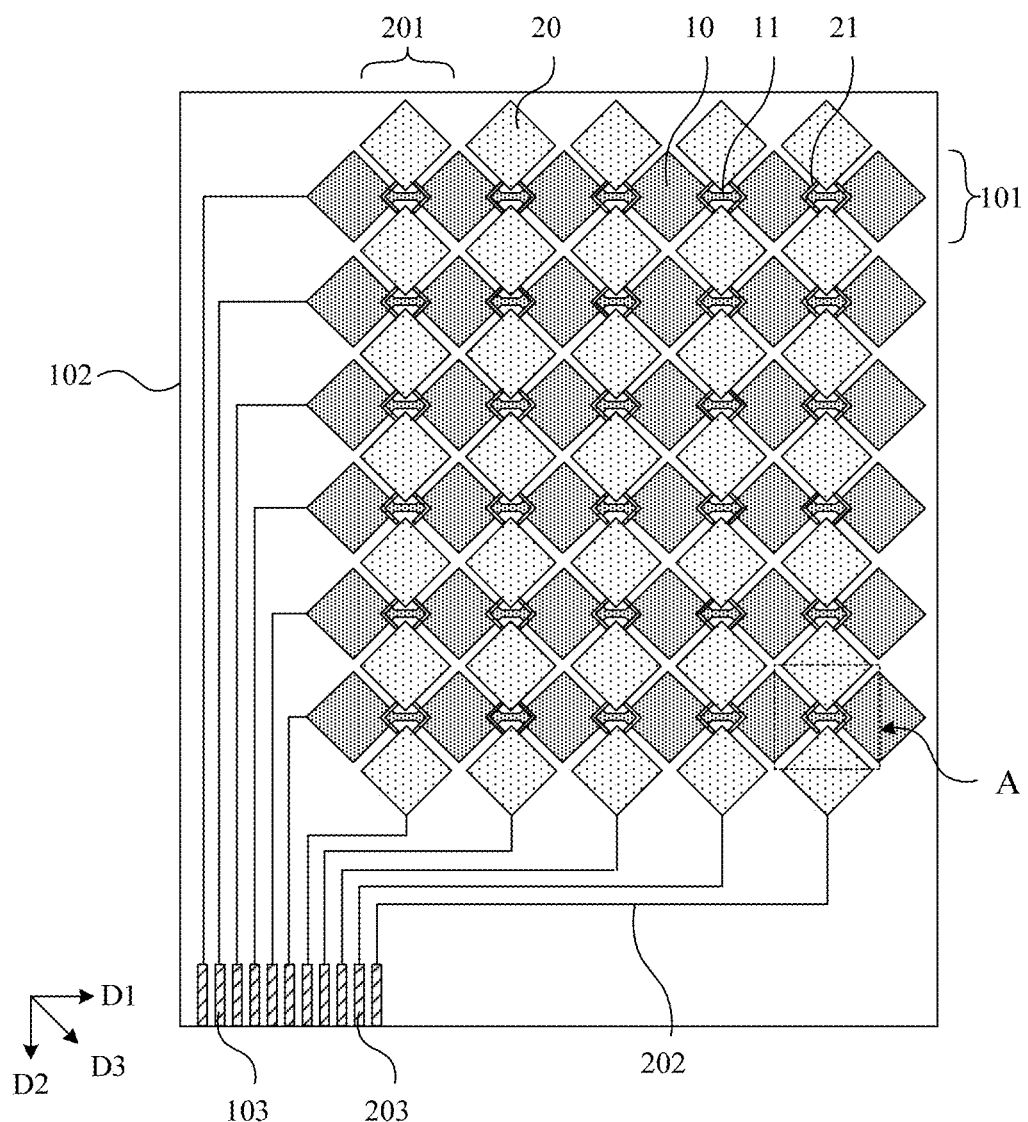
FIG. 1 is a schematic structural diagram of a touch structure layer.

Technical solutions in embodiments of the present disclosure will be described clearly and completely below in conjunction with the accompanying drawings in the embodiments of the present disclosure. It is apparent that the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

In the description of the embodiments of the present disclosure, it should be noted that orientations or positional relationships indicated by the terms "upper", "lower", "left", "right", "top", "inside", "outside", "axial", "four corners", etc. are orientations or positional relationships as shown in the drawings, and are only for the purpose of facilitating and simplifying the description of the embodiments of the present disclosure instead of indicating or implying that structures indicated have particular orientations, be constructed and operated in the particular orientations, so that these terms are not construed as limiting the present disclosure.

In the description of the embodiments of the present disclosure, unless otherwise explicitly defined and defined, the terms "connected", "fixedly connected", "mounted", and "assembled" shall be understood broadly, and, for example, connection may be fixed connection, or detachable connection, or integral connection; and the terms "mounted", "connected", and "fixedly connected" can be direct connection, or connection by means of an intermediate, or internal interconnection between two elements. Those of ordinary skill in the art can understand the specific meanings of the above terms in the embodiments of the present disclosure according to specific situations.

A touch substrate provided by the embodiments of the present disclosure, including a touch structure layer arranged on a base. The touch structure layer includes a plurality of first touch electrodes disposed in a first direction and a plurality of touch electrodes disposed in a second direction; the first direction and the second direction intersect; the touch structure layer includes a metal mesh; the metal mesh includes a plurality of mesh patterns; each mesh pattern is a polygon composed of a plurality of metal lines; the plurality of mesh patterns are provided with a plurality of first notches and a plurality of second notches; the plurality of first notches are located at boundary positions of the first touch electrodes and the second touch electrodes; the plurality of second notches are located at other positions except for the boundary positions; each first notch enables the corresponding metal line to form first broken lines, and each second notch enables the corresponding metal line to form second broken lines; in each of the plurality of mesh patterns, the first broken lines and the metal lines adjacent to the first broken lines form a first broken line unit, and the second broken lines and the metal lines adjacent to the second broken lines form a second broken line unit; and the form of the first broken line unit is different from the form of the second broken line unit.

In some exemplary embodiments, the touch substrate further includes a display structure layer arranged on the base. The touch structure layer is arranged on the display structure layer; the display structure layer includes a light-emitting a light-emitting region and a non-light-emitting region; the light-emitting region includes a plurality of sub pixels arranged periodically; and the non-light-emitting region includes sub pixel boundaries between adjacent sub pixels; a region defined by an orthographic projection of the metal line of the mesh pattern on the base includes an orthographic projection of at least one sub pixel on the base, and an orthographic projection of the sub pixel boundary on the base includes the orthographic projection of the metal line of the mesh pattern on the base.

In some exemplary embodiments, the display structure layer may be a liquid crystal display (LCD) structure layer, or may be an organic light-emitting diode (OLED) structure layer, or may be a plasma display panel (PDP) structure layer, or may be an electrophoretic display (EPD) structure layer. In some exemplary embodiments, the display structure layer is an OLED structure layer; the OLED structure layer includes a base, a driving circuit layer arranged on the base, a light-emitting structure layer arranged on the driving circuit layer, and a package layer arranged on the light-emitting structure layer. The touch structure layer is arranged on the package layer of the display structure layer.

In some exemplary embodiments, the touch structure layer includes a bridging layer, an insulation layer and a touch layer which are stacked on the display structure layer in sequence; the touch layer includes the metal mesh; the touch layer includes the plurality of first touch electrodes, the plurality of second touch electrodes and a plurality of first connection parts; the first connection parts are connected to two adjacent first touch electrodes; the first touch electrodes and the first connection parts are alternately disposed; the bridging layer includes a plurality of second connection parts; and the second connection parts are connected to two adjacent second touch electrodes through via holes formed in the insulation layer.

In some exemplary embodiments, FIG. 1 is a schematic structural diagram of a touch structure layer. As shown in FIG. 1, the touch structure layer includes a plurality of first touch units 101 and a plurality of second touch units 201; each first touch unit 101 has a line shape extending in a first direction D1, and the plurality of first touch units 101 are arranged in sequence in a second direction D2; each second touch unit 201 has a line shape extending in the second direction D2, and the plurality of second touch units 201 are arranged in sequence in the first direction D1; and the first direction D1 and the second direction D2 intersect.

Each first touch unit 101 includes a plurality of first touch electrodes 10 and first connection parts 11 arranged in the first direction D1; and the plurality of first touch electrodes 10 and the plurality of first connection parts 11 are alternately disposed and are connected in sequence. Each second touch unit 201 includes a plurality of second touch electrodes 20 arranged in the second direction D2; the plurality of second touch electrodes 20 are disposed at intervals; and adjacent second touch electrodes 20 are connected to each other through second connection parts 21. A layer where the second connection parts 21 are located is different from layers where the first touch electrodes 10 and the second touch electrodes 20 are located. The first touch electrodes 10 and the second touch electrodes 20 are alternately arranged in a third direction D3; and the third direction D3 intersects with the first direction D1 and the second direction D2.

Each first touch unit 101 is connected to a first bonding pad electrode 103 through a first transmission line 102; and each second touch unit 201 is connected to a second bonding pad electrode 203 through a second transmission line 202. In an exemplary implementation mode, the first touch electrode 10 is connected to a drive of a display panel through the first bonding pad electrode 103, and the second touch electrode 20 is connected to the drive through the second bonding pad electrode 203; the drive applies a driving signal to the second touch electrode 20, and receives an output signal from the first touch electrode 10, or the drive can apply the driving signal to the first touch electrode 10, and receives an output signal from the second touch electrode 20. The drive can determine a touch position by detecting inductive signals generated in a plurality of electrodes when different electrodes emit touch signals.

In some exemplary implementation modes, the touch structure layer may include a bridging layer, an insulation layer and a touch layer which are stacked. The plurality of first touch electrodes 10, the plurality of second touch electrodes 20 and the plurality of first connection parts 11 may be disposed on the touch layer on the same layer and may be formed by the same patterning process. The first touch electrode 10 and the first connection part 11 may be a mutually connected integrated structure; the second connection parts 21 may be arranged on the bridging layer; and adjacent second touch electrodes 20 are mutually connected through via holes formed in the insulation layer. In some exemplary implementation modes, the plurality of first touch electrodes 10, the plurality of second touch electrodes 20 and the plurality of second connection parts 21 may be disposed on the touch layer on the same layer. The second touch electrode 20 and the second connection part 21 may be a mutually connected integrated structure; the first connection parts 11 may be arranged on the bridging layer; and adjacent first touch electrodes 10 are mutually connected through via holes formed in the insulation layer. In some exemplary implementation modes, the first touch electrode may be a driving electrode (Tx), and the second touch electrode may be an induction electrode (Rx); or, the first touch electrode may be an induction electrode (Rx), and the second touch electrode may be a driving electrode (Tx).

In some exemplary implementation modes, the first touch electrode 10 and the second touch electrode 20 may be rhombic. In some other exemplary implementation modes, the first touch electrode 10 and the second touch electrode 20 may be in any one shape or various shapes of triangle, square, trapezoid, parallelogram, pentagon, hexagonal, and other polygons. The embodiments of the present disclosure do not limit this.

In some exemplary implementation modes, the first touch electrode 10 and the second touch electrode 20 may be of a metal mesh form. The metal mesh is formed by interweaving a plurality of metal lines; the metal mesh includes a plurality of mesh patterns; and each mesh pattern is a polygon formed by a plurality of metal lines. The first touch electrode 10 and the second touch electrode 20 of the metal mesh form have the advantages of low resistance, small thickness, high reaction speed, and the like. In some exemplary implementation modes, in one mesh pattern, a region defined by the metal lines includes a sub pixel region in the display structure layer, and each metal line is located between adjacent sub pixels. For example, when the display structure layer is an OLED display structure layer, the sub pixel region is a light-emitting region defined by a pixel defining layer in the light-emitting structure layer; a region defined by the metal lines includes a light-emitting region; and the metal lines are located at corresponding positions of the pixel defining layer, i.e., in a non-light-emitting region.

Figures 1, 2:
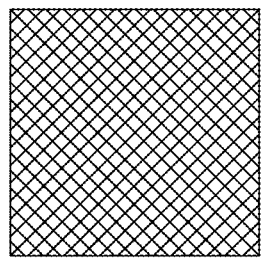
Figure 2:
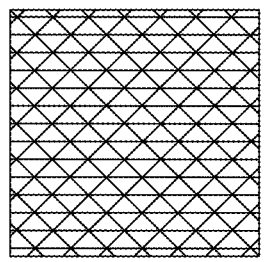
Figures 2, 3:
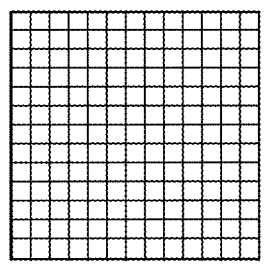
Figures 2, 3, 4:
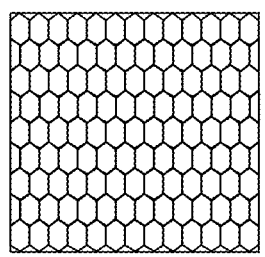

In some exemplary implementation modes, FIG. 2-1 to FIG. 2-5 are schematic structural diagrams of several metal meshes. As shown in FIG. 2-1 to FIG. 2-5, the metal mesh includes a plurality of mesh patterns; the mesh pattern is a polygon formed by metal lines, or the metal mesh is formed by repeatedly and continuously disposing and splicing mesh patterns. In some exemplary implementation modes, the mesh pattern defined by the metal lines may be rhombic, as shown in FIG. 2-1. Or, the mesh pattern defined by the metal lines may be triangular, as shown in FIG. 2-2. Or, the mesh pattern defined by the metal lines may be rectangular, as shown in FIG. 2-3. Or, the mesh pattern defined by the metal lines may be hexagonal, as shown in FIG. 2-4. Or, the mesh pattern defined by the metal lines may be a combination of various shapes, such as a combination of pentagons and hexagons, as shown in FIG. 2-5. Or, the mesh pattern defined by the metal lines may be in any one shape or various shapes of triangle, square, rectangle, rhombus, trapezoid, pentagon, and hexagonal. In some possible implementation modes, the mesh pattern defined by the metal lines may be in a regular shape, or an irregular shape; the side of the mesh pattern may be straight or curved. The embodiments of the present disclosure do not limit this. In some possible implementation modes, the line width of the metal line of the metal mesh is less than or equal to 5 μm.

In some exemplary implementation modes, FIG. 3 is a schematic structural diagram of a touch structure layer in the form of metal mesh. FIG. 3 is an enlarged view of a region A in FIG. 1. The structure shown in FIG. 3 can be regarded as one repetitive unit of the touch structure layer. As shown in FIG. 3, the touch layer of the touch structure layer is a metal mesh, and a mesh pattern is hexagonal. The first touch electrodes 10 and the second touch electrodes 20 are arranged on the touch layer on the same layer. In order to enable the first touch electrodes 10 and the second touch electrodes 20 to be mutually insulated, the metal mesh is provided with a plurality of first notches 30; and the plurality of first notches 30 break the metal lines of the mesh patterns to realize isolation of the mesh patterns of the first touch electrodes 10 from the mesh patterns of the second touch electrodes 20. The black blocks in FIG. 3 represent the first notches 30, and the first notches 30 can be understood as imaginary lines for cutting off the metal lines. Imaginary connecting lines of the plurality of first notches 30 located at boundary positions of the first touch electrodes 10 and the second touch electrodes 20 can be referred to as first boundaries 500. In some exemplary implementation modes, the touch structure layer includes a bulk region 100, a boundary region 200, and a connection bridge region 300 in a direction parallel to the touch substrate. Each mesh pattern of the touch layer located in the boundary region 200 is provided with the first notches 30, and the first notches 30 cut off the metal lines of the mesh pattern, so that each mesh pattern is divided into two parts, one part of which belongs to the first touch electrode 10 and the other part of which belongs to the second touch electrode 20. The bulk region 100 includes the first touch electrodes 10 and the second touch electrodes. The connection bridge region 300 includes first connection parts and second connection parts; the first connection parts are used for realizing connection between two adjacent first touch electrodes 10, and the second connection parts are used for realizing connection between two adjacent second touch electrodes 20; one of the first connection part and the second connection part is located on the touch layer, and the other one is located on the bridging layer. In some exemplary implementation modes, the touch layer of the bulk region 100 is also provided with a plurality of second notches 40; the plurality of second notches 40 break the metal lines of the mesh patterns; the plurality of second notches 40 can form one or more dummy regions 70 in the bulk region 100; the dummy region 70 can be insulated from the first touch electrodes 10 or the second touch electrodes 20 in the bulk region 100 where the dummy region is located. The shape of the dummy region 70 may not be limited. The dummy region 70 can be regarded as a region defined by imaginary connecting lines of the plurality of second notches 40, and the imaginary connecting lines of the plurality of second notches 40 can be referred to as second boundaries 900. The bulk region 100 located on one side of the boundary region 200 includes the first touch electrodes 10 and the dummy regions 70, and the bulk region 100 located on the other side of the boundary region 200 includes the second touch electrodes 20 and the dummy regions 70. In some other exemplary implementation modes, the plurality of second notches 40 arranged on the touch layer of the bulk region 100 may not form the dummy regions 70. The plurality of second notches 40 are arranged inside the first touch electrodes 10 and the second touch electrodes 20, so that the notches are uniformly disposed on the metal mesh as much as possible to avoid only disposing the notches in the boundary region 200. As such, the defect of watermarks of the boundary region 200 can be improved.

In some exemplary implementation modes, the display structure layer includes a plurality of pixel units arranged regularly. Each pixel unit may include a red (R) sub pixel, a green (G) sub pixel, and a blue (B) sub pixel. In some other examples, each pixel unit may include four sub pixels. For example, each pixel unit includes a red sub pixel, a green sub pixel, a blue sub pixel and a white sub pixel, or each pixel unit includes a red sub pixel, two green sub pixels and a blue sub pixel. In the embodiments of the present disclosure, the number and arrangement of the sub pixels in each pixel unit are not limited. FIG. 4-1 to FIG. 4-3 illustrate schematic structural diagrams of three pixel units. The four sub pixels can be rectangular and arranged side by side, which are respectively as follows from left to right: R sub pixel, G sub pixel, B sub pixel and G sub pixel, as shown in FIG. 4-1. Or, the four sub pixels can be pentagonal and hexagonal, and are arranged side by side. Two pentagonal G sub pixels are located in the middle of the pixel unit; and the hexagonal R sub pixel and the hexagonal B sub pixel are respectively located on two sides of the G sub pixels, as shown in FIG. 4-2. When the pixel unit includes three sub pixels, three rectangular sub pixels can be arranged side by side in a horizontal direction, or can be arranged side by side in a vertical direction, as shown in FIG. 4-3. In some possible implementation modes, each sub pixel can be in any one shape or various shapes of triangle, square, rectangle, rhombus, trapezoid, parallelogram, pentagon, hexagon, and other polygons, and can be arranged in an X shape, a cross or an equilateral triangle. The embodiments of the present disclosure do not limit this.

Figures 2, 3, 4, 5:
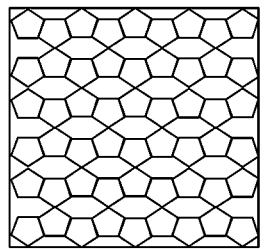
Figure 3:
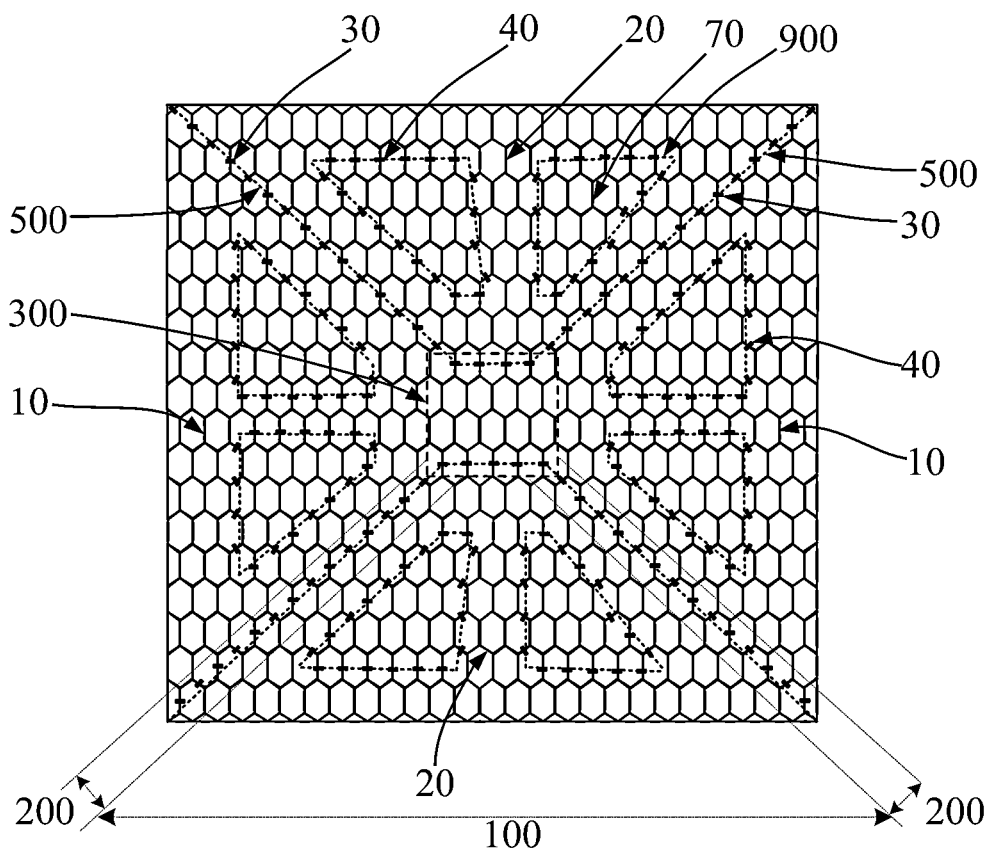
Figures 1, 4:
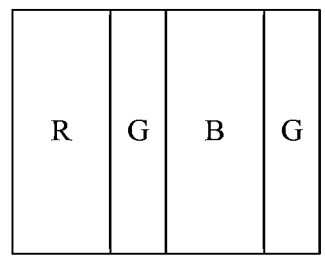
Figures 2, 4:
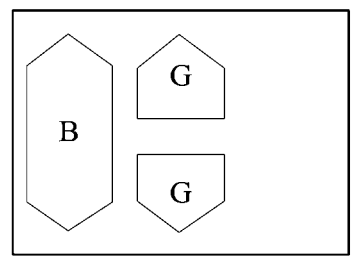
Figures 3, 4:
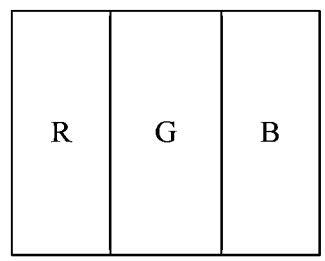
Figure 5:
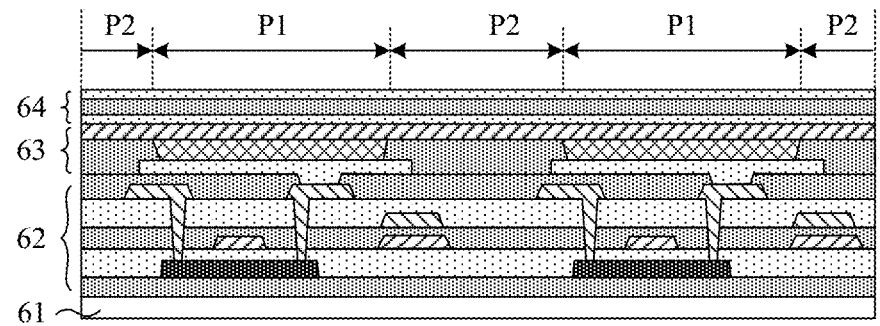

In some exemplary implementation modes, FIG. 5 is a schematic diagram of a sectional structure of a display structure layer, illustrating the structures of two sub pixels during OLED displaying. As shown in FIG. 5, on a plane perpendicular to the display structure layer, the display structure layer includes a driving circuit layer 62 arranged on a base 61, a light-emitting structure layer 63 arranged on the driving circuit layer 62, and a package layer 64 arranged on the light-emitting structure layer 63. When the touch substrate of the embodiments of the present disclosure is formed, the touch structure layer is arranged on the package layer 64. The base 61 may be a flexible base or a rigid base. In some possible implementation modes, the display structure layer may further include other film layers; other film layers may be arranged between the touch structure layer and the package layer. The embodiments of the present disclosure do not limit this.

In some exemplary implementation modes, the base 61 is a flexible base. The base 61 may include a first flexible material layer, a first inorganic material layer, a semiconductor layer, a second flexible material layer, and a second inorganic material layer which are stacked; materials of the first flexible material layer and the second flexible material layer may be polyimide (PI), polyethylene terephthalate (PET) or a polymer flexible film subjected to surface treatment; materials of the first inorganic material layer and the second inorganic material layer may be silicon nitride (SiNx) or silicon oxide (SiOx) and used for improving the water and oxygen resistance of the base; and the material of the semiconductor layer may be amorphous silicon (a-si).

In some exemplary implementation modes, the driving circuit layer 62 may include a transistor and a storage capacitor that constitute a pixel driving circuit. FIG. 5 takes each sub pixel including one transistor and one storage capacitor as an example for illustration. In some possible implementation modes, the driving circuit layer 62 of each sub pixel may include a first insulation layer arranged on the base, an active layer arranged on the first insulation layer, a second insulation layer covering the active layer, a gate electrode and a first capacitive electrode which are arranged on the second insulation layer, a third insulation layer covering the gate electrode and the first capacitive electrode, a second capacitive electrode arranged on the third insulation layer, a fourth insulation layer covering the second capacitive electrode, a source electrode and a drain electrode which are arranged on the fourth insulation layer, and a planarization layer covering the foregoing structures, wherein a via hole is formed in the fourth insulation layer, and the via hole exposes the active layer, and the source electrode and the drain electrode are respectively connected to the active layer through the via hole. The active layer, the gate electrode, the source electrode, and the drain electrode form the transistor, and the first capacitive electrode and the second capacitive electrode form the storage capacitor. In some possible implementation modes, the first insulation layer, the second insulation layer, the third insulation layer, and the fourth insulation layer can use any one or more of silicon oxide (SiOx), silicon nitride (SiNx), and silicon oxynitride (SiON), and may be a single layer, multiple layers, or a composite layer. The first insulation layer can be referred to as a buffer layer and is used to improve the water and oxygen resistance of the base; the second insulation layer and the third insulation layer can be referred to as a gate insulation (GI) layer; and the fourth insulation layer can be referred to as an interlayer insulation (ILD) layer. A first metal thin film, a second metal thin film, and a third metal thin film can use a metal material, such as any one or more of silver (Ag), copper (Cu), aluminum (Al), titanium (Ti), and molybdenum (Mo), or an alloy material of the above metals, such as aluminum-neodymium alloy (AlNd) or molybdenum-niobium alloy (MoNb), and can be of a single-layer structure, or a multi-layer composite structure, such as Ti/Al/Ti. The active layer thin film can use amorphous indium gallium zinc oxide (a-IGZO), zinc oxynitride (ZnON), indium zinc tin oxide (IZTO), amorphous silicon (a-Si), polysilicon (p-Si), hexathiophene or polythiophene, etc., that is, the embodiments of the present disclosure are applicable to transistors fabricated based on an oxide technology, a silicon technology, or an organic matter technology.

In some exemplary implementation modes, the light-emitting structure layer 63 may include an anode, a pixel defining layer, an organic light-emitting layer and a cathode. The anode is disposed on the planarization layer and is connected to the drain electrode through the via hole formed in the planarization layer. The pixel defining layer is disposed on the anode and the planarization layer and is provided with a pixel opening; the pixel opening exposes the anode; the organic light-emitting layer is arranged in the pixel opening; the cathode is arranged on the organic light-emitting layer; and the organic light-emitting layer emits light of a corresponding color under the action of a voltage applied to the anode and the cathode. In some exemplary implementation modes, the package layer 64 may include a first package layer, a second package layer and a third package layer that are stacked; the first package layer and the third package layer may be made of inorganic materials, and the second package layer may be made of an organic material; and the package layer 64 can prevent external water vapor from entering the light-emitting structure layer 63.

In some exemplary implementation modes, the display structure layer includes a light-emitting region and a non-light-emitting region. As shown in FIG. 5, since the organic light-emitting layer emits the light in the pixel opening region defined by the pixel defining layer, the pixel opening region is the light-emitting region P1, a region outside the pixel opening is the non-light-emitting region P2, and the non-light-emitting region P2 is located at the periphery of the light-emitting region P1. In the embodiments of the present disclosure, each light-emitting region P1 is referred to as a sub pixel, such as a red sub pixel, a blue sub-pixel or a green sub pixel, and each non-light-emitting region P2 is referred to as a sub pixel boundary. As such, the light-emitting region of the display structure layer includes a plurality of sub pixels arranged periodically, and the non-light-emitting region of the display structure layer includes sub pixel boundaries between adjacent sub pixels.

Figure 6:
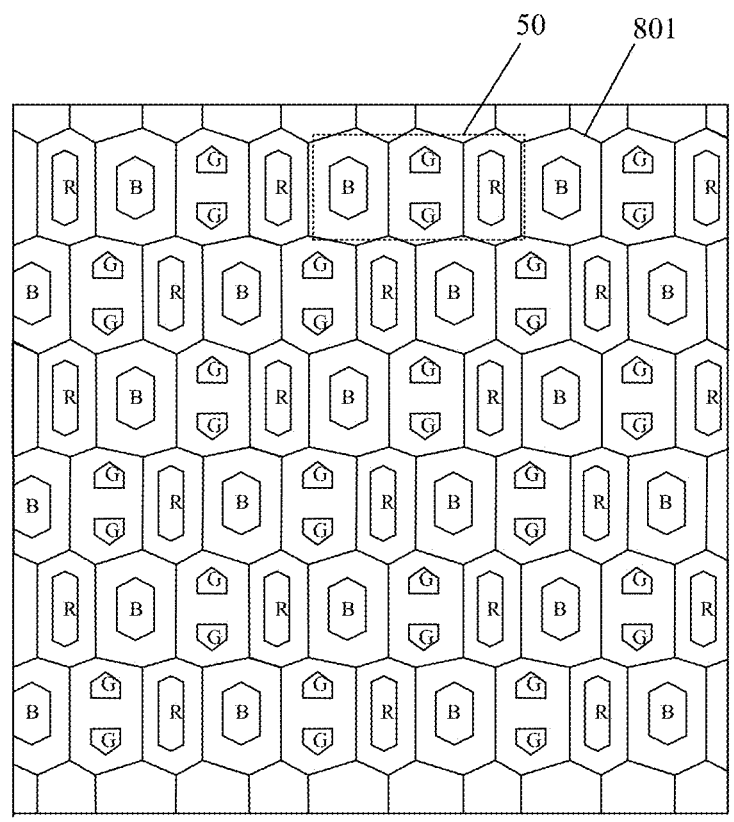
FIG. 6 is a schematic diagram of corresponding positions of a metal mesh of a touch structure layer and sub pixels of a display structure layer in some exemplary embodiments.

In the embodiments of the present disclosure, as shown in FIG. 6, the display structure layer includes a plurality of pixel units 50 arranged regularly. When the pixel unit 50 uses the structure shown in FIG. 4-2, the mesh pattern 801 of the metal mesh of the touch layer in the touch structure layer is hexagonal, and the shape of the mesh pattern 801 matches the shapes of the B sub pixel and the R sub pixel in the pixel unit 50. The B sub pixel and R sub pixel in one pixel unit 50 are respectively located in the regions defined by two mesh patterns 801, and the two G sub pixels are located in the region defined by the same mesh pattern 801. The metal lines of the mesh pattern 801 are located within the sub pixel boundaries between adjacent sub pixels.

In the embodiments of the present disclosure, when the mesh pattern is in a polygonal shape, each side of the polygon can be regarded as each metal line of the mesh pattern, and the number of sides of the polygon is the number of metal lines of the mesh pattern. For example, when the mesh pattern is hexagonal, the mesh pattern has six metal lines. In the mesh pattern, the metal line provided with the first notch is referred to as a first metal line, and the metal line provided with the second notch is referred to as a second metal line. The first notch and the first metal line are taken as an example. The first notch may be set at the middle position (which may be a centered position or a non-centered position) of the first metal line, and the first metal line is broken from the middle to form two first broken lines. Alternatively, the first notch may be arranged at one end of the first metal line, and it can be regarded that the end part of the first metal line is cut off by the first notch, and the remaining part of the first metal line forms one first broken line. In the same way, the second notch, the second metal line and the second broken line can be understood in the same way.

Figure 7:
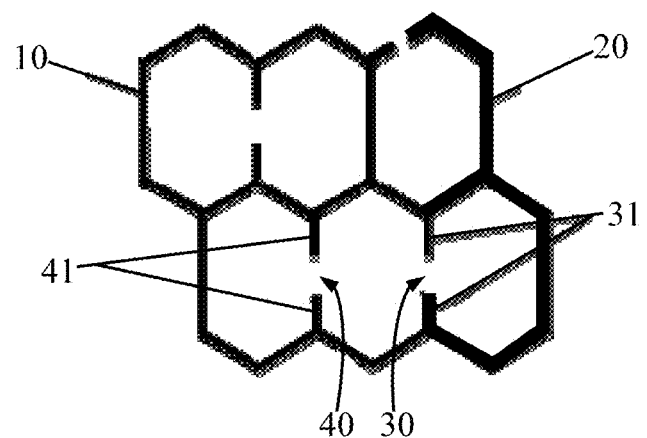
FIG. 7 is a schematic structural diagram of a first notch and a second notch of a metal mesh of a touch structure layer in some technologies.

In some touch substrates, as shown in FIG. 7, the mesh pattern at the boundary position between the first touch electrode 10 and the second touch electrode 20 is provided with a first notch 30, and the first touch electrode 10 is internally provided with a second notch 40. The form of first broken lines 31 formed by the first notch 30 is the same as the form of second broken lines 41 formed by the second notch 40. As such, when there is a metal remain at the first notch 30 or the second notch 40, which causes a short between the metal lines, the first notch 30 and the second notch 40 cannot be distinguished, so that when a detection device (such as an automated optical inspection device, i.e., an AOI device) detects a metal remain defect, it cannot be determined whether the specific location of the defect belongs to the boundary region or the touch region, and the defect cannot be repaired in time, which will affect the increase in yield.

Figure 8:
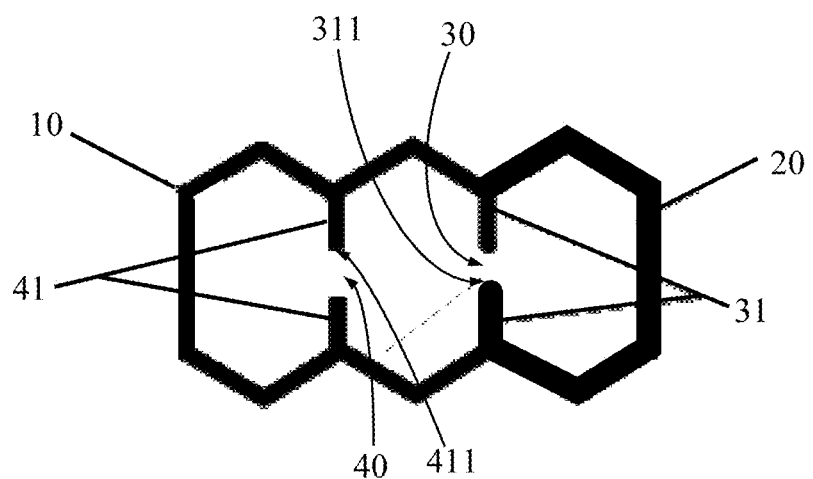
FIG. 8 to FIG. 14 are respectively schematic structural diagrams of a first notch and a second notch of a metal mesh of a touch structure layer in some exemplary embodiments.

In some exemplary embodiments, the form of the first broken line unit includes an end surface shape of the first broken line 31, and the form of the second broken line unit includes an end surface shape of the second broken line 41; and the end surface shape of the first broken line 31 is different from the end surface shape of the second broken line 41. For example, as shown in FIG. 8, FIG. 8 illustrates three mesh patterns that are disposed side by side. The mesh pattern is hexagonal. Thin lines in the mesh patterns represent the first touch electrode 10, and thick lines represent the second touch electrode 20. In this text, the thin lines and thick lines in the mesh patterns are only for distinguishing the first touch electrode 10 and the second touch electrode 20, and do not represent a real line width. The real line width of the first touch electrode 10 and the second touch electrode 20 may be the same. A first notch 30 is arranged at the middle position of the metal line shared by the mesh pattern in the middle and the mesh pattern on the right side, and the metal line (i.e., the first metal line) includes two first broken lines 31. A second notch 40 is arranged at the middle position of the metal line shared by the mesh pattern on the left side and the mesh pattern in the middle, and the metal line (i.e., the second metal line) includes two second broken lines 41. The second notch 40 is arranged on the mesh pattern of the first touch electrode 10. In FIG. 8 of this example, only one first notch 30 and one second notch 40 are shown, and other first notches 30 at the boundary positions of the first touch electrode 10 and the second touch electrode 20 in the three mesh patterns are not shown. Exemplarily, an end surface 411 of the second broken line 41 is a plane, and an end surface 311 of the first broken line 31 may be any one or more of a curved surface, a slope and a folding surface. The curved surface may be a cambered surface, a wavy surface, and etc. The folding surface includes at least two intersecting surfaces. For example, the folding surface includes an intersecting plane and slope, or the folding surface includes a plurality of intersecting slopes. In other examples, the end surface 411 of the second broken line 41 may be any of a curved surface, a slope and a folding surface, and the end surface 311 of the first broken line 31 may be any one or more of a plane, a curved surface, a slope and a folding surface that is different from the end surface shape of the second broken line 41. In the example shown in FIG. 8, the end surfaces 411 of the two second broken lines 41 are both planes, and the end surfaces 311 of the two first broken lines 31 are both cambered surfaces, or the end surface 311 of one of the first broken lines 31 is set to be a cambered surface, and the end surface 311 of the other first broken line 31 is set to be a plane or in any other shapes.

Figure 9:
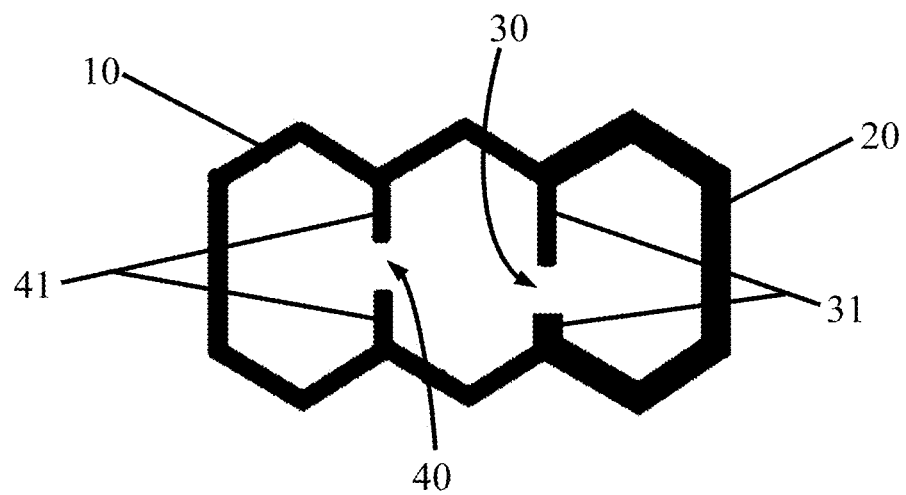

In some exemplary embodiments, the first notch enables the corresponding metal line to be broken from the middle to form the two first broken lines, and the second notch enables the corresponding metal line to be broken from the middle to form the two second broken lines; the form of the first broken line unit includes lengths of the two first broken lines, and the form of the second broken line unit includes lengths of the two second broken lines; the lengths of the two first broken lines are the same, and the lengths of the two second broken lines are different; or, the lengths of the two first broken lines are different, and the lengths of the two second broken lines are the same. The two first broken lines with different lengths and the two second broken lines with the same lengths are taken as an example for illustration. As shown in FIG. 9, FIG. 9 illustrates three mesh patterns disposed side by side. The mesh pattern is hexagonal. Thin lines in the mesh patterns represent the first touch electrode 10, and thick lines represent the second touch electrode 20. A first notch 30 is arranged at the non-centered position of the metal line shared by the mesh pattern in the middle and the mesh pattern on the right side, and the first notch 30 enables the metal line to be broken from the middle to form two first broken lines 31 with different lengths. A second notch 40 is arranged at the centered position of the metal line shared by the mesh pattern on the left side and the mesh pattern in the middle, and the second notch 40 enables the metal line to be broken from the middle to form two second broken lines 41 with the same lengths. The second notch 40 is arranged on the mesh pattern of the first touch electrode 10.

Figure 10:
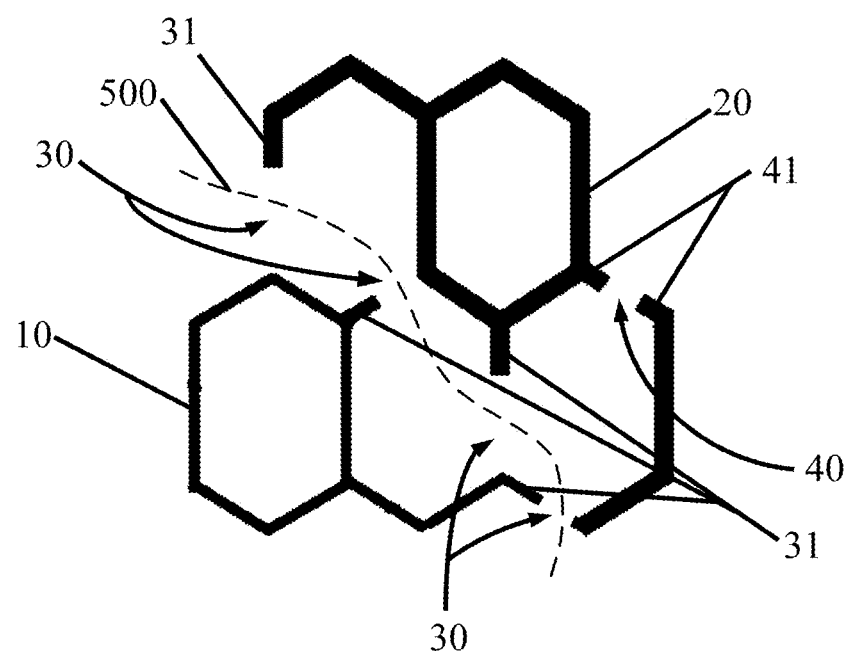

In some exemplary embodiments, the form of the first broken line unit includes the number of the first broken lines, and the form of the second broken line unit includes the number of the second broken lines; the number of the first broken lines is different from the number of the second broken lines; the first notch enables the corresponding metal line to be broken from the middle to form two first broken lines, or the first notch enables one end of the corresponding metal line to be cut off to form one first broken line. The first notch enabling one end of the corresponding metal line to be cut off to form one first broken line is taken as an example. As shown in FIG. 10, FIG. 10 illustrates five mesh patterns. The five mesh patterns are arranged in two rows. The mesh pattern is hexagonal. A first notch 30 is arranged on a vertical metal line of the mesh pattern on the left side of the first row. The first notch 30 enables one end of the vertical metal line to be cut off to form one first broken line 31. A first notch 30 is arranged on a metal line shared by the mesh pattern on the left side of the first row and the mesh pattern in the middle of the second row. The first notch 30 enables one end of the metal line to be cut off to form one first broken line 31. A first notch 30 is arranged on a metal line shared by the mesh pattern in the middle of the second row and the mesh pattern on the right side of the second row. The first notch 30 enables one end of the metal line to be cut off to form one first broken line 31. A first notch 30 is arranged on another metal line of the mesh pattern on the right side of the second row. The first notch 30 enables one end of the metal line to be cut off to form one first broken line 31. In the five mesh patterns shown in FIG. 10, there are four first notches 30 and four first broken lines 31 in total. The metal lines (i.e., the first metal lines) provided with the first notches 30 each form one first broken line 31. A second notch 40 is arranged in the mesh pattern of the second touch electrode 20, and the second notch 40 enables the corresponding metal line to be broken from the middle to form two second broken lines 41.

In some exemplary embodiments, in the case that the first notch enables one end of the corresponding metal line to be cut off to form one first broken line, an imaginary connecting line of the plurality of first notches is referred to as a first boundary; in an extending direction of the first boundary, one of two adjacent first broken lines is connected to the first touch electrode, and the other first broken line is connected to the second touch electrode. As shown in FIG. 10, in the mesh pattern provided with the first notch 30, at least two metal lines of the mesh pattern are provided with the first notches 30, and the metal lines (i.e., the first metal lines) provided with the first notches 30 each form one first broken line 31. In the five mesh patterns shown in FIG. 10, there are four first notches 30 and four first broken lines 31 in total. An imaginary connecting line that connects the four first notches 30 in series is the first boundary 500 for the first touch electrode 10 and the second touch electrode 20. The mesh pattern on one side of the first boundary 500 is the first touch electrode 10, and the mesh pattern of the first touch electrode 10 is represented by thin lines. The mesh pattern on the other side of the first boundary 500 is the second touch electrode 20, and the second touch electrode 20 is represented by thick lines. In an extending direction of the first boundary 500, one first broken line 31 of two adjacent first broken lines 31 is connected to the first touch electrode 10, and the other first broken line 31 is connected to the second touch electrode 20. It can also be understood that the first touch electrode 10 and the second touch electrode 20 are alternately provided with the first broken lines 31 in the extending direction of the first boundary 500. As the first touch electrode 10 and the second touch electrode 20 are alternately provided with the first broken lines 31 in the extending direction of the first boundary 500, on one hand, the first notch 30 and the second notch 40 are distinguished favorably, and on the other hand, the risk of short circuit in a metal route at the boundary position of the first touch electrode 10 and the second touch electrode 20 can be lowered.

Figure 11:
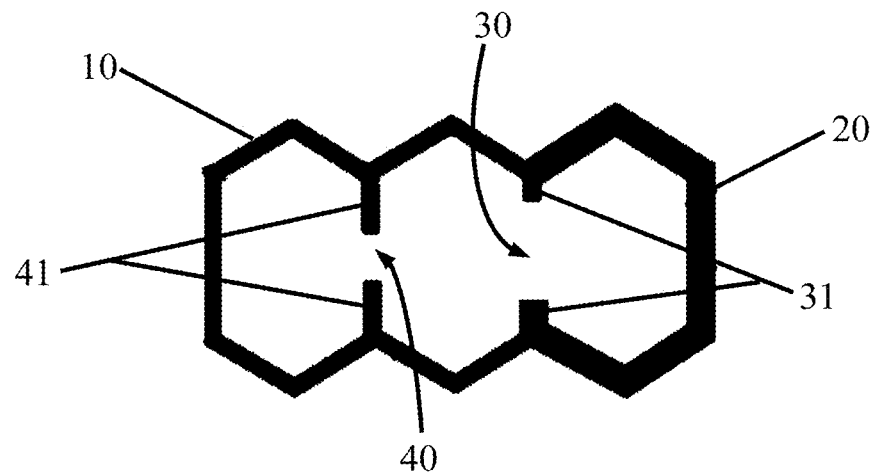

In some exemplary embodiments, the first notch enables the corresponding metal line to be broken from the middle to form the two first broken lines, and the second notch enables the corresponding metal line to be broken from the middle to form the two second broken lines; the form of the first broken line unit includes a distance between the two first broken lines, and the form of the second broken line unit includes a distance between the two second broken lines; and the distance between the two first broken lines is different from the distance between the two second broken lines. For example, as shown in FIG. 11, FIG. 11 illustrates three mesh patterns that are disposed side by side. The mesh pattern is hexagonal. Thin lines in the mesh patterns represent the first touch electrode 10, and thick lines represent the second touch electrode 20. A first notch 30 is arranged at the middle position of the metal line shared by the mesh pattern in the middle and the mesh pattern on the right side, and the first notch 30 enables the metal line to be broken from the middle to form two first broken lines 31. A second notch 40 is arranged at the middle position of the metal line shared by the mesh pattern on the left side and the mesh pattern in the middle, and the second notch 40 enables the metal line to be broken from the middle to form two second broken lines 41. The second notch 40 is arranged on the mesh pattern of the first touch electrode 10. In the embodiment shown in FIG. 11, the distance between the two first broken lines 31 is greater than the distance between the two second broken lines 41. It can also be understood that the width of the first notch 30 is greater than the width of the second notch 40. The increase in the distance between the two first broken lines 31 is beneficial to distinguishing the first notch 30 and the second notch 40 on the one hand, and can lower the risk of short circuit in the metal route at the boundary position between the first touch electrode 10 and the second touch electrode 20 on the other hand.

In some exemplary embodiments, in order to make the form of the first broken line unit different from the form of the second broken line unit, the following solution may be adopted: the first broken line is provided with a mark part, and the second broken line is not provided with a mark part; or, the metal line adjacent to the first broken line is provided with a mark part, and the metal line adjacent to the second broken line is not provided with a mark part. For example, the mark part may include a convex strip or a convex block protruding from the corresponding metal line. The convex block may be in any one or more of the following shapes: polygon, circle, and ellipse. The polygon may be triangle, rectangle, rhombus, etc.

Figure 12:
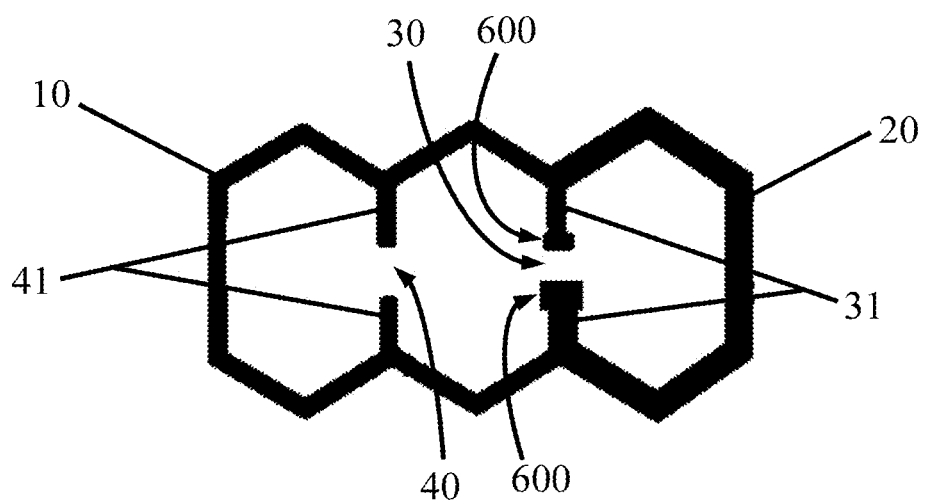

In some exemplary embodiments, an end part of the first broken line close to the first notch is provided with the mark part. For example, as shown in FIG. 12, FIG. 12 illustrates three mesh patterns that are disposed side by side. The mesh pattern is hexagonal. Thin lines in the mesh patterns represent the first touch electrode 10, and thick lines represent the second touch electrode 20. A first notch 30 is arranged at the middle position of the metal line shared by the mesh pattern in the middle and the mesh pattern on the right side. The first notch 30 enables the metal line to be broken from the middle to form two first broken lines 31. The end part of the first broken line 31 close to the first notch 30 is provided with a mark part 600, and the mark part 600 is a convex block. The shape of the convex block may not be limited. For example, the convex block may be in a regular shape such as rectangular, rhombic, circular and elliptical, or in an irregular shape. The convex block protrudes from the rest part of the first broken line 31 in a direction perpendicular to the first broken line 31. A second notch 40 is arranged at the middle position of the metal line shared by the mesh pattern on the left side and the mesh pattern in the middle. The second notch 40 enables the metal line to be broken from the middle to form two second broken lines 41. The second broken line 41 is not provided with a mark part 600. The second notch 40 is arranged on the mesh pattern of the first touch electrode 10. In the present embodiment, an end part of at least one of the two first broken lines 31 close to the first notch 30 is provided with the mark part 600, and the end parts of the two first broken lines 31 close to the first notch 30 may be both provided with the mark part 600.

Figure 13:
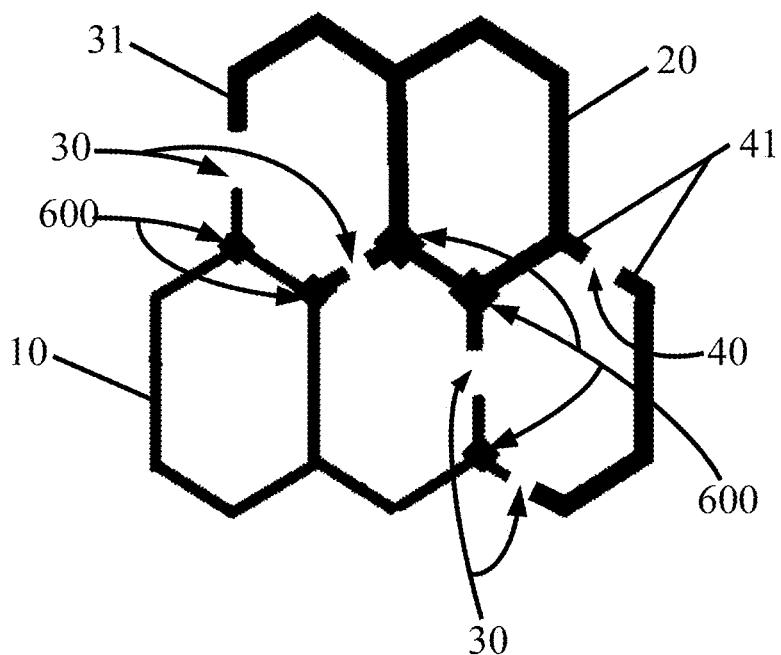

In some exemplary embodiments, the mark parts are arranged at positions of the first broken lines intersecting with other metal lines. In the present embodiment, when the first notch enables the corresponding metal line to be broken from the middle to form two first broken lines, there are two positions of the two first broken lines intersecting with other metal lines. One of the two intersecting positions may be provided with the mark part, or the two intersecting positions are both provided with the mark part. The mark part may be a convex strip or a convex block protruding from the intersecting position. In one example of the present embodiment, as shown in FIG. 13, FIG. 13 illustrates five mesh patterns. The five mesh patterns are arranged in two rows. The mesh pattern is hexagonal. Thin lines in the mesh patterns represent the first touch electrode 10, and thick lines represent the second touch electrode 20. A first notch 30 is arranged on the left vertical metal line of the mesh pattern on the left side of the first row. The first notch 30 enables the vertical metal line to be broken from the middle to form upper and lower first broken lines 31. A mark part 600 is arranged at an intersecting position between the lower first broken line 31 and the inclined metal line at the lower left part of the mesh pattern on the left side of the first row. A first notch 30 is arranged on the metal line shared by the mesh pattern on the left side of the first row and the mesh pattern in the middle of the second row. The first notch 30 enables the metal line to be broken from the middle to form two first broken lines 31. Mark parts 600 are arranged at intersecting positions respectively between the two first broken lines 31 and the inclined metal line at the lower left part of the mesh pattern on the left side of the first row as well as the right vertical metal line of the mesh pattern on the left side of the first row. A first notch 30 is arranged on the metal line shared by the mesh pattern in the middle of the second row and the mesh pattern on the right side of the second row. The first notch 30 enables the metal line to be broken from the middle to form upper and lower first broken lines 31. Mark parts 600 are arranged at intersecting positions between the two first broken lines 31 and other metal lines. A first notch 30 is arranged on the inclined metal line at the lower left part of the mesh pattern on the right side of the second row. The first notch 30 enables the metal line to be broken from the middle to form two first broken lines 31. A mark part 600 is arranged at an intersecting position between one first broken line 31 and the left vertical metal line of the mesh pattern on the right side of the second row. A second notch 40 is arranged on the metal line at the upper right part of the mesh pattern on the right side of the second row. The second notch 40 enables the metal line to be broken from the middle to form two second broken lines 41. The two second broken lines 41 are not provided with the mark part 600. The second notch 40 is arranged inside the second touch electrode 20. In this example, the mark part 600 is a rectangular convex block. In other examples, the convex block may be in a regular shape such as circle, ellipse, rhombus, or triangle or in an irregular shape. In this example, the first notch 30 enables the corresponding metal line to be broken from the middle to form two first broken lines 31, and the second notch 40 enables the corresponding metal line to be broken from the middle to form two second broken lines 41. In other examples, the first notch 30 can enable one end of the corresponding metal line to be cut off to form one first broken line 31, and the second notch 40 can enable one end of the corresponding metal line to be cut off to form one second broken line 41.

Figure 14:
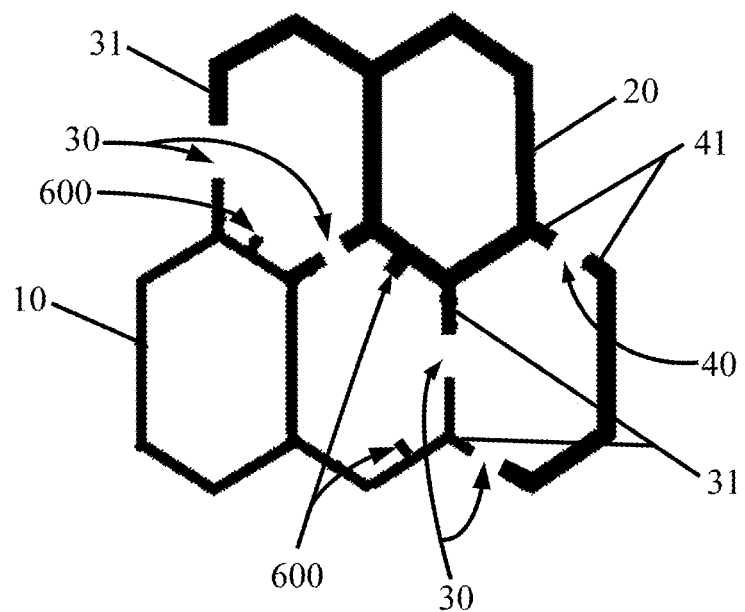
Figure 15:
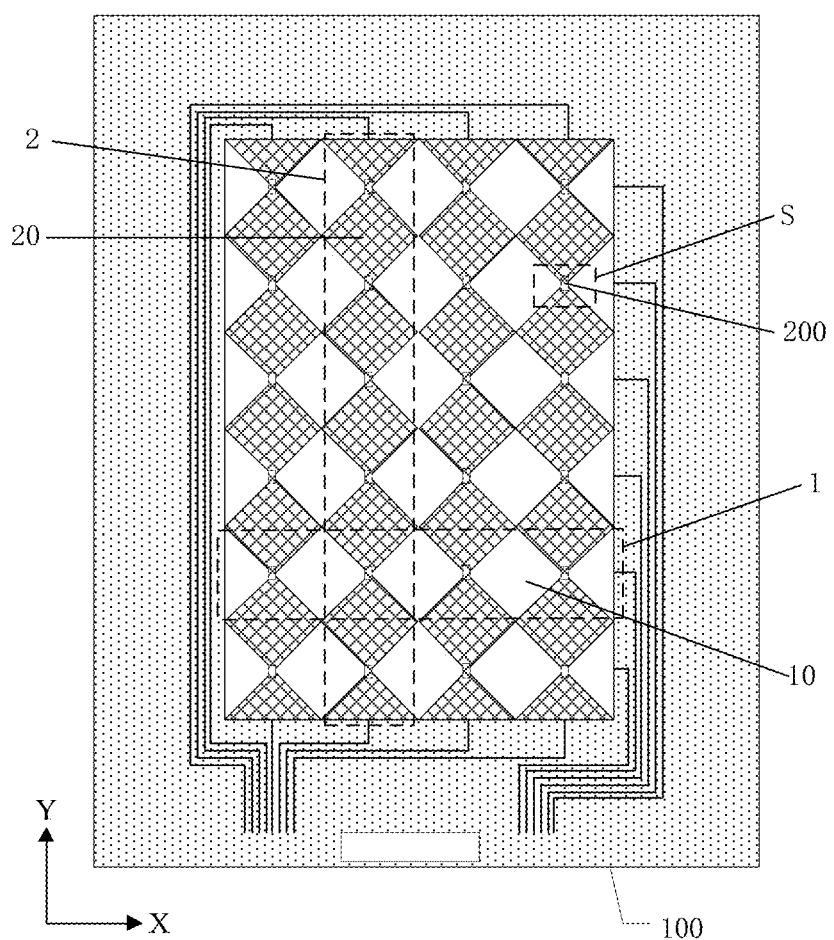
FIG. 15 is a schematic structural diagram of a touch electrode layer in a touch substrate provided in another embodiment of the present disclosure.

In some exemplary embodiments, the metal line adjacent to the first broken line is provided with a mark part, and the metal line adjacent to the second broken line is not provided with a mark part. In one example of the present embodiment, the mark part is arranged at the middle position (centered or non-centered position) of the metal line adjacent to the first broken line. The mark part may be a convex strip or a convex block protruding from the corresponding metal line. For example, as shown in FIG. 14, FIG. 14 illustrates five mesh patterns. The five mesh patterns are arranged in two rows. The mesh pattern is hexagonal. Thin lines in the mesh patterns represent the first touch electrode 10, and thick lines represent the second touch electrode 20. A first notch 30 is arranged on a vertical metal line of the mesh pattern on the left side of the first row. The first notch 30 enables the vertical metal line to be broken from the middle to form upper and lower first broken lines 31. A first notch 30 is arranged on a metal line shared by the mesh pattern on the left side of the first row and the mesh pattern in the middle of the second row. The first notch 30 enables the metal line to be broken from the middle to form two first broken lines 31. A first notch 30 is arranged on a metal line shared by the mesh pattern in the middle of the second row and the mesh pattern on the right side of the second row. The first notch 30 enables the metal line to be broken from the middle to form two first broken lines 31. A first notch 30 is arranged on an inclined metal line at the lower left part of the mesh pattern on the right side of the second row. The first notch 30 enables the metal line to be broken from the middle to form two first broken lines 31. A second notch 40 is arranged on the metal line at the upper right part of the mesh pattern on the right side of the second row. The second notch 40 enables the metal line to be broken from the middle to form two second broken lines 41. The two second broken lines 41 are not adjacent to the first broken lines 31 (This may be understood as indirect connection). The second notch 40 is arranged inside the second touch electrode 20. The metal line shared by the mesh pattern on the left side of the first row and the mesh pattern on the left side of the second row is provided with a mark part 600. This metal line provided with the mark part 600 is adjacent to the two first broken lines 31 connected to two ends of the metal line. The inclined metal line at the upper right part of the mesh pattern in the middle of the second row is provided with a mark part 600. This metal line is adjacent to the two first broken lines 31 connected to two ends of the metal line. The inclined metal line at the lower right part of the mesh pattern in the middle of the second row is provided with a mark part 600. This inclined metal line is adjacent to the two first broken lines 31 connected to the same end of the metal line. In the mesh pattern, the metal line adjacent to the second broken line 41 is not provided with a mark part. In this example, the mark part 600 is a convex strip protruding from the corresponding metal line. There is one mark part 600. In other examples, the mark part 600 may be a convex block protruding from the corresponding metal line. There may be one or more mark parts 600. In this example, the first notch 30 enables the corresponding metal line to be broken from the middle to form two first broken lines 31, and the second notch 40 enables the corresponding metal line to be broken from the middle to form two second broken lines 41. In other examples, the first notch 30 can enable one end of the corresponding metal line to be cut off to form one first broken line 31, and the second notch 40 can enable one end of the corresponding metal line to be cut off to form one second broken line 41.

In the embodiments shown in FIG. 8 to FIG. 14, the form of the first broken line unit is different from the form of the second broken line unit by using various solutions, so that the first notch and the second notch can be distinguished. As such, when the detection device (such as the AOI device) detects a defect in the touch structure layer, since the first notch and the second notch can be distinguished, the detection device can determine whether the specific location of the defect belongs to the boundary position between the first touch electrode and the second touch electrode or belongs to other positions except the boundary position. Therefore, the defect can be repaired in time, and the yield of the product can be increased.

Figure 16:
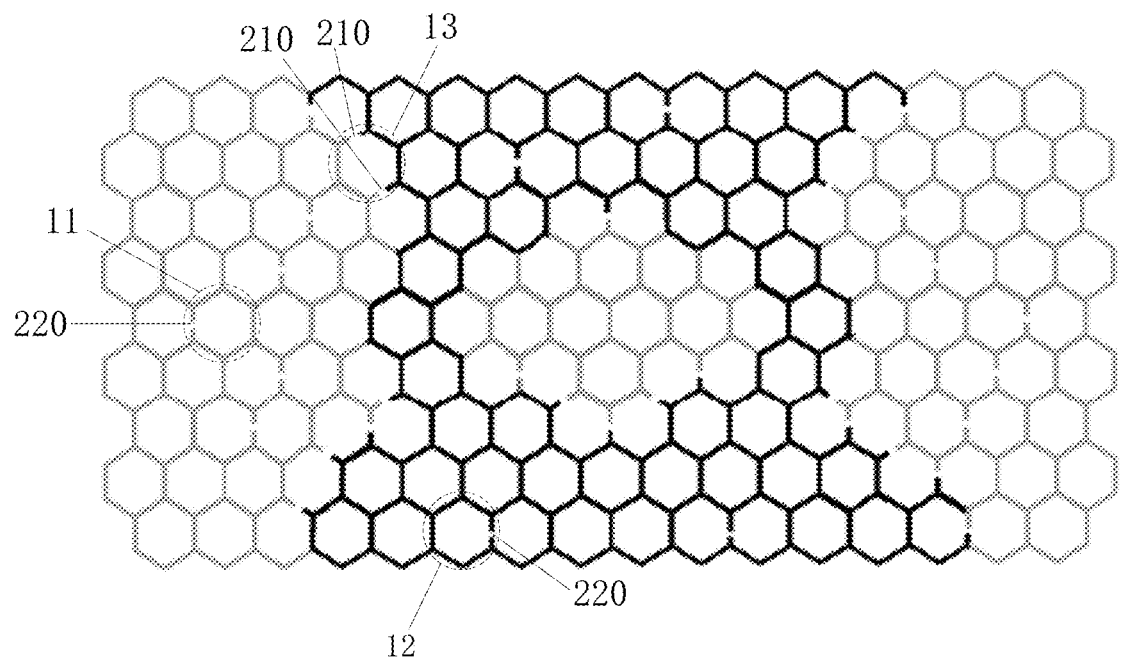
FIG. 16 is a partially enlarged schematic structural diagram of the touch electrode layer in FIG. 15.

Based on the same inventive concept, the embodiments of the present disclosure further provide another touch substrate, referring to FIG. 15 to FIG. 23. Specifically, FIG. 16 is a schematic enlarged view of the structure of a touch electrode layer of a dashed box region S in FIG. 15. The schematic structural diagrams from FIG. 17 to FIG. 23 are example illustrations for specific embodiments of the present disclosure. The touch substrate includes a base substrate 100 and a touch electrode layer located on the base substrate 100. The touch electrode layer is of a mesh type structure including lead wires.

As shown in FIG. 15 to FIG. 23, the touch electrode layer includes a plurality of first touch electrodes 1 extending in a first direction X and a plurality of second touch electrodes 2 extending in a second direction Y; the first direction X and the second direction Y intersect; the first touch electrodes 1 include a plurality of first touch sub-electrodes 10 arranged in the first direction X, and the second touch electrodes 2 include a plurality of second touch sub-electrodes 20 arranged in the second direction Y; each first touch sub-electrode 10 includes a plurality of first touch electrode meshes 11 (meshes defined by gray lines in FIG. 16), and each second touch sub-electrode 20 includes a plurality of second touch electrode meshes 12 (meshes defined by black lines in FIG. 16); the touch electrode layer further includes a plurality of boundary meshes 13 (meshes jointly defined by gray lines and black lines in FIG. 16) located between adjacent first touch sub-electrodes 10 and second touch sub-electrodes 20; each boundary mesh 13 includes at least two first mesh lines 21; each first mesh line 21 is provided with a first break 210; the first breaks 210 in the plurality of boundary meshes 13 enable adjacent first touch sub-electrodes 10 and second touch sub-electrodes 20 to be insulated from each other; second mesh lines 22 are arranged in the first touch electrode meshes 11 and/or the second touch electrode meshes 12; and the second mesh lines 22 are provided with second breaks 220.

As shown in FIG. 17 to FIG. 23, a pattern shape of the first mesh lines 21 and a pattern shape of the second mesh lines 22 are different; or, the mesh lines in the boundary meshes 13 are provided with protruding parts 3.

Specifically, the "mesh line" is a line defining a mesh. In the present disclosure, the touch electrode layer is of the mesh type structure defined by the lead wires, and materials of the mesh lines are the lead wires. Exemplarily, the lead wires may be metal materials, i.e., the touch electrode layer may be of a metal mesh pattern structure.

Specifically, the first touch electrodes (the first touch sub-electrodes) and the second touch electrodes (the second touch sub-electrodes) may be respectively configured as transmitting electrodes and induction electrodes. The dashed box region in FIG. 15 includes an intersection region of one first touch electrode 1 and one second touch electrode 2. Two first touch sub-electrodes 10 (first touch electrode meshes 11) of the intersection region in the first direction X are directly connected, and two second touch sub-electrodes 20 (second touch electrode meshes 12) of the intersection region in the second direction Y are electrically connected through a bridge structure 200. Specifically, the bridge structure 200 may also adopt a mesh structure. For example, the enlarged view of the interior of the intersection region shown in FIG. 16 is a schematic diagram after overlapping of the touch electrode layer mesh and the bridge structure mesh pattern. Specifically, in the touch electrode layer mesh, there is a boundary mesh 13 between the first touch electrode mesh 11 and the second touch electrode mesh 12, and the first break 210 in the boundary mesh 13 disconnects the first touch electrode mesh 11 from the second touch electrode mesh 12, so that the first touch sub-electrode 10 and the second touch sub-electrode 20 are insulated.

Specifically, in the figures provided by the embodiments of the present disclosure, referring to FIG. 16 to FIG. 23, a mesh completely defined by gray lines is the first touch electrode mesh 11, a mesh completely defined by black lines is the second touch electrode mesh 12, and a mesh defined by gray lines and black lines is the boundary mesh 13. It should be noted that, in the figures provided by the embodiments of the present disclosure, only part of the mesh structure in the touch electrode layer and part of the breaks in the mesh structure are schematically drawn. Therefore, in specific implementation, an actual graph of the touch electrode layer is not limited to the standard of these accompanying drawings. Specifically, in the touch electrode layer, all the first breaks arranged in the boundary mesh are configured to be able to disconnect the electrical connection between the first touch electrode mesh and the second touch electrode mesh; the second breaks arranged in the first touch electrode mesh and the second touch electrode mesh may be specifically arranged according to current distribution needs and/or a requirement for avoiding continuous patterns to cause moire.

Specifically, the first direction X and the second direction Y are orthogonal, that is, the extending direction of the first touch electrode 1 and the extending direction of the second touch electrode 2 may be orthogonal to each other.

In the touch substrate provided by the embodiments of the present disclosure, the touch electrode layer includes a first touch sub-electrode 10 (first touch electrode mesh 11), a second touch sub-electrode 20 (second touch electrode mesh 12) and a boundary mesh 13 located between the first touch sub-electrode 10 and the second touch sub-electrode 20. The boundary mesh 13 is internally provided with a first break 210 so that the first touch sub-electrode 10 (first touch electrode mesh 11) and the second touch sub-electrode 20 (the second touch electrode mesh 12) are disconnected and insulated. The first touch electrode mesh 11 and/or the second touch electrode mesh 12 are/is internally provided with a second break 220. Since the pattern shape of the first mesh line 21 provided with the first break 210 is different from the pattern shape of the second mesh line 22 provided with the second break 220, or the mesh line in the boundary mesh 13 is provided with a protruding part 3, it is easy and effective to distinguish the boundary mesh 13 from the first touch electrode mesh 11 and the second touch electrode mesh 12, and the first mesh line 21 can be directly distinguished from the second mesh line 22 and the first break 210 can be directly distinguished from the second break 220. Furthermore, when a defect occurs in the touch electrode layer, the detection device can quickly and effectively detect the specific location of the defect and repair it in time, thereby improving the yield.

Specifically, for example, due to the problems such as metal remain, the touch electrode layer is prone to electrical connection of the breaks of the mesh lines to cause a short defect. At this time, it is extremely difficult to determine the specific location of a defective break by means of the AOI device. In the present disclosure, since the pattern shapes of the first mesh line and the second mesh line provided with the breaks are different, it is easy to find the position of the defective break through the AOI device, and determine that the defective location is in a mesh of a touch unit or at the boundary mesh between two touch units, so that the efficiency of detection and repair can be effectively improved.

In addition, since in the touch electrode layer, the pattern shape of the first mesh line 21 provided with the first break 210 is set differently from the pattern shape of the second mesh line 22 provided with the second break 220, or the mesh line in the boundary mesh 13 is provided with the protruding part 3, the pattern shape of the boundary mesh is different from the pattern shape of the touch electrode mesh (the first touch electrode mesh and the second touch electrode mesh), and the boundary mesh and the touch electrode mesh can be easily distinguished. Therefore, the solution of the embodiment of the present disclosure can quickly determine the specific location of the short circuit defect of the touch electrode layer, and can improve the determination efficiency for specific positions and types of other defects and the repair efficiency for the defects. For example, it is conductive to improving the detection efficiency for a breakage defect of a certain position, and details thereof are omitted here.

Specifically, the touch substrate provided by the embodiments of the present disclosure may be a display substrate fabricated by a flexible multi layer on cell (FMLOC) technology, that is, when the display substrate is designed, a film layer of a touch electrode is directly manufactured on a light-emitting film layer and a package film layer, thereby reducing the use of OCA. Moreover, connection is realized without a TFPC, so that lightweight and thinness of a product can be well achieved.

Of course, the touch substrate provided by the embodiments of the present disclosure may also be a structure independent of the display substrate, and is configured to be bonded to the display substrate through the OCA.

As shown in FIG. 16, in some embodiments, each mesh (the first touch electrode mesh 11, the second touch electrode mesh 12 and the boundary mesh 13) in the mesh type structure of the touch electrode layer is hexagonal. At this time, the touch electrode layer has a honeycomb pattern with regular structure, good stability and easy patterning, and has a large aperture ratio, which is beneficial to increasing the aperture ratio of a display panel.

Specifically, FIG. 17 to FIG. 23 illustrate part of the first touch electrode meshes 11 and the boundary meshes 13. The following illustrates some specific embodiments of the present disclosure with reference to FIG. 17 to FIG. 23.

As shown in FIG. 17 to FIG. 23, in some embodiments, the boundary mesh 13 includes a first mesh line 21; the first mesh line 21 includes a first break 210 and first broken lines 211; the first break 210 breaks the first mesh line 21 to form the first broken lines 211; the first touch electrode mesh 11 and/or the second touch electrode mesh are/is provided with a second mesh line 22; the second mesh line 22 has a second break 220 and second broken lines 221; and the second break 220 breaks the second mesh line 22 to form the second broken lines 221.

Specifically, the first mesh line 21 and the second mesh line 22 are both a section of the mesh line defining a mesh. For example, if the mesh is a hexagon, each of the first mesh line 21 and the second mesh line 22 is a side defining the hexagon.

Specifically, the first mesh line 21 is a section of the mesh line defining the boundary mesh 13, and the second mesh line 22 is a section of the mesh line defining the first touch electrode mesh 11 and/or the second touch electrode mesh. Both the first mesh line 21 and the second mesh line 22 are internally provided with breaks, so that broken lines are formed in the first mesh line 21 and the second mesh line 22, and the electrical connection between the broken lines is disconnected.

Exemplarily, the first touch electrode mesh 11 and the second touch electrode mesh are both internally provided with second mesh lines 22, that is, both the first touch electrode mesh 11 and the second touch electrode mesh are internally provided with the second breaks 220.

As shown in FIG. 17 to FIG. 22, in some embodiments, the pattern shapes of the first break 210 and the first broken line 211 are different from the pattern shapes of the second break 220 and the second broken line 221.

Specifically, the pattern shapes of the first break 210 and the first broken line 211 are different from the pattern shapes of the second break 220 and the second broken line 221, so that it is easy to determine whether the defective break is located in a touch electrode unit or at the boundary between two touch electrode units, and it is easy to determine the specific location and type of the defect. For example, it is easy to determine whether the first mesh line 21 between two touch electrodes has a short circuit defect or the second mesh line 22 in a certain touch electrode has a short circuit defect.

Figure 17:
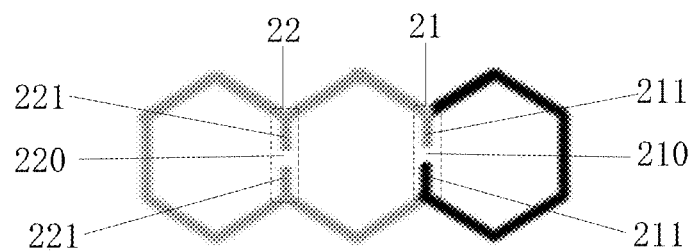
FIG. 17 is a partially schematic structural diagram of a touch electrode layer in a touch substrate provided in another embodiment of the present disclosure.
Figure 18:
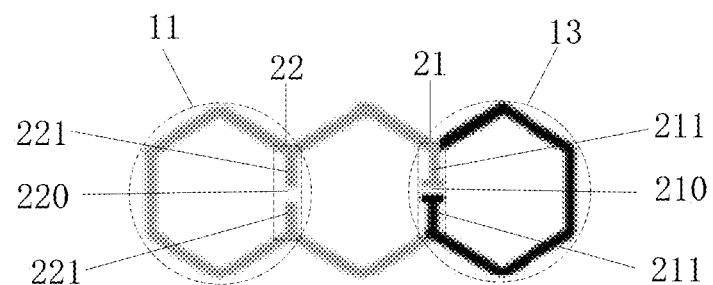
FIG. 18 is a partially schematic structural diagram of a touch electrode layer in a touch substrate provided in another embodiment of the present disclosure.

In some specific embodiments, as shown in FIG. 17 and FIG. 18, the cross-sectional shape of an end of the first broken line 211 close to the first break 210 is different from the cross-sectional shape of an end of the second broken line 221 close to the second break 220. Thus, by observing the cross-sectional shape of the end part of the broken line, the types and locations of the corresponding break and broken line can be determined.

Exemplarily, the cross section of the end of the first broken line 211 close to the first break 210 is non-rectangular, and the cross section of the end of the second broken line 221 close to the second break 220 is rectangular.

Specifically, for example, as shown in FIG. 17, the cross section of the end of the first broken line 211 close to the first break 210 may be fan-shaped, or, as shown in FIG. 18, the cross section of the end of the first broken line 211 close to the first break 210 may be T-shaped.

Figure 19:
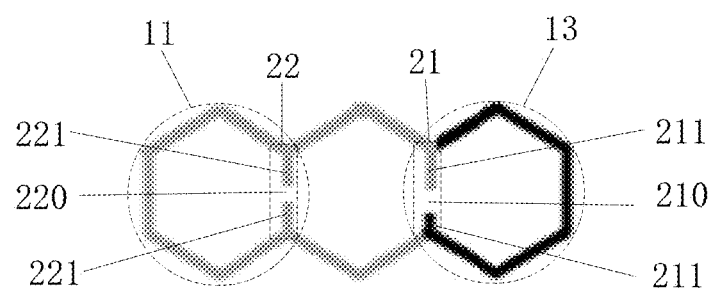
FIG. 19 is a partially schematic structural diagram of a touch electrode layer in a touch substrate provided in another embodiment of the present disclosure.

In some specific embodiments, as shown in FIG. 19, the length of the first broken line 211 is different from the length of the second broken line 221. Specifically, by observing the lengths of the broken lines, the types and locations of the corresponding breaks and broken lines can be determined.

Exemplarily, as shown in FIG. 19, the first mesh line 21 includes one first break 210 and two first broken lines 211 respectively located at two ends of the first break 210; and the two first breaks 211 are different in length. The second mesh line 22 includes one second break 220 and two second broken lines 221 respectively located at two ends of the second break 220; and the two second broken lines 221 are the same in length. At this time, the lengths of the two first broken lines 211 and the two second broken lines 221 are different. The two second broken lines 221 are arranged symmetrically with respect to the second break 220, and the two first broken lines 211 have uneven lengths on two sides of the first break 210, so that it is easy to distinguish the first broken lines and the second broken lines.

Figure 20:
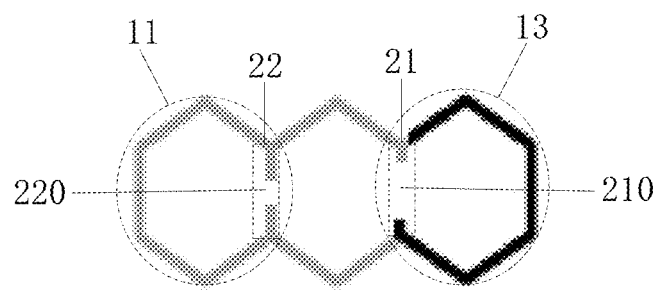
FIG. 20 is a partially schematic structural diagram of a touch electrode layer in a touch substrate provided in another embodiment of the present disclosure.

In some specific embodiments, as shown in FIG. 20, a spacing width of the first break 210 is different from the spacing width of the second break 220. Specifically, by observing the width of the break, the types and locations of the corresponding breaks and broken lines can be determined.

Exemplarily, the spacing width of the first break 210 is greater than the spacing width of the second break 220.

Figure 21:
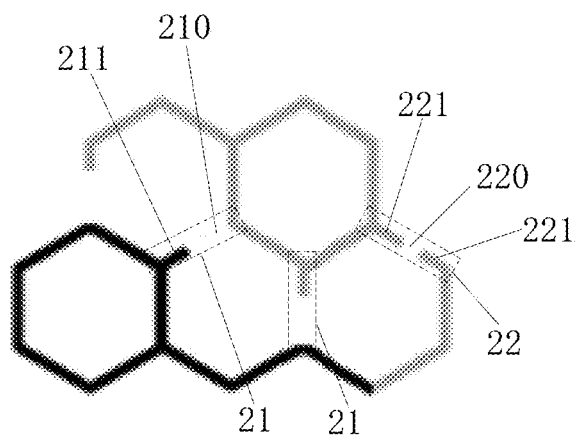
FIG. 21 is a partially schematic structural diagram of a touch electrode layer in a touch substrate provided in another embodiment of the present disclosure.

In some specific embodiments, as shown in FIG. 21, the number of the first broken lines 211 in the first mesh line 21 is different from the number of the second broken lines 221 in the second mesh line 22. Specifically, by observing the number of the broken lines adjacent to the break, the types and locations of the corresponding breaks and broken lines can be determined.

Exemplarily, the first mesh line 21 includes one first break 210 and one first broken line 211 located at one end of the first break 210; the second mesh line 22 includes one second break 220 and two second broken lines 221 respectively located at two ends of the second break 220.

Figure 22:
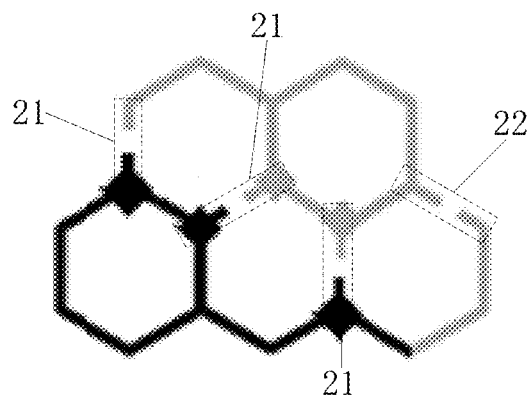
FIG. 22 is a partially schematic structural diagram of a touch electrode layer in a touch substrate provided in another embodiment of the present disclosure.

In some specific embodiments, as shown in FIG. 22, the size and/or shape of the end part of the first mesh line 21 is different from the size and/or shape of the end part of the second mesh line 22. Specifically, by observing the size and/or shape of the end part of the mesh line, the types and locations of the breaks and broken lines of this section of mesh line.

Exemplarily, the sizes of the two end parts of the second mesh line 22 are the same; and the size of at least one end part of the first mesh line 21 is greater than the size of the end part of the second mesh line 22. For example, as shown in FIG. 22, the sizes of two end parts of the first mesh line 21 are greater than the sizes of the two end parts of the second mesh line 22.

Exemplarily, the two end parts of the second mesh line 22 are conventionally circular, and the two end parts of the first mesh line 21 may be square.

Figure 23:
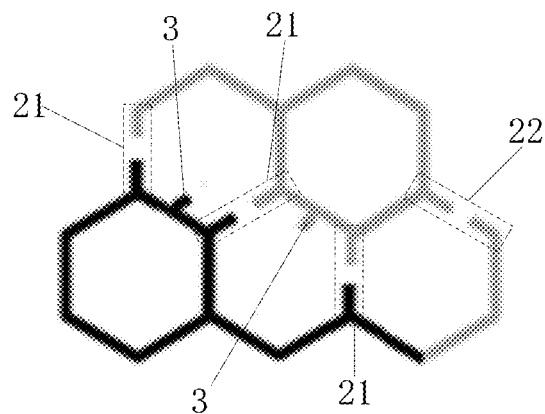
FIG. 23 is a partially schematic structural diagram of a touch electrode layer in a touch substrate provided in another embodiment of the present disclosure.

As shown in FIG. 23, in some embodiments, a protruding part 3 is arranged on the mesh line in the boundary mesh, and the mesh line provided with the protruding part 3 is located between two first mesh lines 21 in the boundary mesh. Exemplarily, two ends of the mesh line provided with the protruding part 3 are connected to the two first mesh lines 21 respectively. Specifically, by observing whether there is a protruding part on the mesh line, the types and locations of the mesh line adjacent to this section of the mesh line, the breaks, and the broken lines can be determined.

Exemplarily, the protruding part 3 is a linear structure segment, and extends perpendicularly relative to the mesh line connected thereto.

Exemplarily, the protruding part 3 protrudes toward the inner side of the boundary mesh relative to the mesh line connected thereto.

Based on the same inventive concept, the present disclosure also provides a display device, which includes any one of the above-mentioned touch substrates.

Specifically, the display device may be an OLED display device, which may be specifically applied to display apparatuses such as a tablet computer and a mobile phone.

Exemplarily, the display device may be an FMLOC display device, which has a high degree of integration and is relatively thin and light.

It should be noted that in some embodiments of the present disclosure, the touch substrate and the display device may further include other structures, which may be determined according to actual needs, and the embodiments of the present disclosure do not limit this. In addition, with regard to the shape of the mesh structure provided by the embodiments of the present disclosure, the sizes and shapes of the first mesh line, the first break, the first broken line, the second mesh line, the second break, the second broken line, etc. are not limited to the above embodiments, as long as the pattern shape of the first mesh line in the boundary mesh can be enabled to be different from the pattern shape of the second mesh line in the touch electrode mesh. Repeated details are omitted herein. Furthermore, the drawings of the present disclosure are only schematic diagrams, and the specific sizes and proportions of the structures in the drawings do not represent the actual sizes and proportions of the structures.

Obviously, those skilled in the art can make various changes and modifications to the embodiments of the present disclosure without departing from the spirit and scope of the present disclosure. Therefore, if these changes and modifications made to the present disclosure fall within the scope of the claims of the present disclosure and equivalent technologies of the present disclosure, the present disclosure is intended to include these changes and modifications.

What is claimed is:

1. A touch substrate, comprising:
a base substrate and a touch electrode layer located on the base substrate, wherein
the touch electrode layer is of a mesh type structure comprising lead wires; the touch electrode layer comprises a plurality of first touch electrodes extending in a first direction and a plurality of second touch electrodes extending in a second direction; the first direction and the second direction intersect;
each first touch electrode comprises a plurality of first touch sub-electrodes arranged in the first direction, and each second touch electrode comprises a plurality of second touch sub-electrodes arranged in the second direction; each first touch sub-electrode comprises a plurality of first touch electrode meshes, and each second touch sub-electrode comprises a plurality of second touch electrode meshes;
the touch electrode layer further comprises a plurality of boundary meshes located between adjacent first touch sub-electrode and second touch sub-electrode; each boundary mesh comprises at least two first mesh lines; each first mesh line is provided with a first break; first breaks in the plurality of boundary meshes are configured to enable adjacent first touch sub-electrode and second touch sub-electrode to be insulated from each other; second mesh lines are arranged in a first touch electrode mesh and/or a second touch electrode mesh; the second mesh lines are provided with second breaks;

the first mesh line comprises a first break and a first broken line; the first break breaks the first mesh line to form the first broken line; and the second mesh line comprises a second break and a second broken line; the second break breaks the second mesh line to form the second broken line;
a spacing width of the first break is different from a spacing width of the second break; and the spacing width of the first break is greater than the spacing width of the second break; and
a pattern shape of the first mesh line and a pattern shape of the second mesh line are different.

2. The touch substrate according to claim 1, wherein the plurality of second breaks enclose at least one dummy region within a region where the first touch electrode and/or the second touch electrode is located, and the at least one dummy region is insulated from the first touch electrode and the second touch electrode.

3. The touch substrate according to claim 1, wherein a size and/or shape of an end part of the first mesh line is different from a size and/or shape of an end part of the second mesh line.

4. The touch substrate according to claim 3, wherein sizes of two end parts of the second mesh line are the same; and a size of at least one end part of the first mesh line is greater than the size of the end part of the second mesh line.

5. The touch substrate according to claim 4, wherein sizes of two end parts of the first mesh line are greater than the sizes of two end parts of the second mesh line.

6. The touch substrate according to claim 1, wherein a cross-sectional shape of an end of the first broken line close to the first break is different from a cross-sectional shape of an end of the second broken line close to the second break; and
a cross section of the end of the first broken line close to the first break is non-rectangular, and a cross section of the end of the second broken line close to the second break is rectangular.

7. The touch substrate according to claim 6, wherein the cross section of the end of the first broken line close to the first break is fan-shaped or T-shaped.

8. The touch substrate according to claim 1, wherein a length of the first broken line is different from a length of the second broken line;
the first mesh line comprises one first break and two first broken lines respectively located at two ends of the first break, and the two first broken lines are different in length; and
the second mesh line comprises one second break and two second broken lines respectively located at two ends of the second break, and the two second broken lines are the same in length.

9. The touch substrate according to claim 8, wherein the two second broken lines are symmetrically arranged relative to a centerline of the second break.

10. The touch substrate according to claim 1, wherein a quantity of the first broken lines in the first mesh line is different from a quantity of the second broken lines in the second mesh line;
the first mesh line comprises one first break and one first broken line located at one end of the first break; and
the second mesh line comprises one second break and two second broken lines respectively located at two ends of the second break.

11. A display device, comprising: a base; a driving circuit layer on the base; a light-emitting structure layer on a side of the driving circuit layer facing away from the base, a package layer on a side of the light-emitting structure layer facing away from the base, and a touch substrate on a side of the package layer facing away from the base;
wherein the touch substrate comprises: a base substrate and a touch electrode layer located on the base substrate, wherein
the touch electrode layer is of a mesh type structure comprising lead wires; the touch electrode layer comprises a plurality of first touch electrodes extending in a first direction and a plurality of second touch electrodes extending in a second direction; the first direction and the second direction intersect;
each first touch electrode comprises a plurality of first touch sub-electrodes arranged in the first direction, and each second touch electrode comprises a plurality of second touch sub-electrodes arranged in the second direction; each first touch sub-electrode comprises a plurality of first touch electrode meshes, and each second touch sub-electrode comprises a plurality of second touch electrode meshes;
the touch electrode layer further comprises a plurality of boundary meshes located between adjacent first touch sub-electrode and second touch sub-electrode; each boundary mesh comprises at least two first mesh lines; each first mesh line is provided with a first break; first breaks in the plurality of boundary meshes are configured to enable adjacent first touch sub-electrode and second touch sub-electrode to be insulated from each other; second mesh lines are arranged in a first touch electrode mesh and/or a second touch electrode mesh; the second mesh lines are provided with second breaks;
the first mesh line comprises a first break and a first broken line; the first break breaks the first mesh line to form the first broken line; and the second mesh line comprises a second break and a second broken line; the second break breaks the second mesh line to form the second broken line;
a spacing width of the first break is different from a spacing width of the second break; and the spacing width of the first break is greater than the spacing width of the second break; and
a pattern shape of the first mesh line and a pattern shape of the second mesh line are different.

12. The display device according to claim 11, wherein the plurality of second breaks enclose at least one dummy region within a region where the first touch electrode and/or the second touch electrode is located, and the at least one dummy region is insulated from the first touch electrode and the second touch electrode.

13. The display device according to claim 11, wherein a size and/or shape of an end part of the first mesh line is different from a size and/or shape of an end part of the second mesh line.

14. The display device according to claim 13, wherein sizes of two end parts of the second mesh line are the same; and a size of at least one end part of the first mesh line is greater than the size of the end part of the second mesh line.

15. The display device according to claim 14, wherein sizes of two end parts of the first mesh line are greater than the sizes of two end parts of the second mesh line.

16. The display device according to claim 11, wherein a cross-sectional shape of an end of the first broken line close to the first break is different from a cross-sectional shape of an end of the second broken line close to the second break; and a cross section of the end of the first broken line close to the first break is non-rectangular, and a cross section of the end of the second broken line close to the second break is rectangular.

17. The display device according to claim 16, wherein the cross section of the end of the first broken line close to the first break is fan-shaped or T-shaped.

18. The display device according to claim 11, wherein a length of the first broken line is different from a length of the second broken line;
- the first mesh line comprises one first break and two first broken lines respectively located at two ends of the first break, and the two first broken lines are different in length; and
- the second mesh line comprises one second break and two second broken lines respectively located at two ends of the second break, and the two second broken lines are the same in length.

19. The display device according to claim 18, wherein the two second broken lines are symmetrically arranged relative to a centerline of the second break.

20. The display device according to claim 11, wherein a quantity of the first broken lines in the first mesh line is different from a quantity of the second broken lines in the second mesh line;
- the first mesh line comprises one first break and one first broken line located at one end of the first break; and
- the second mesh line comprises one second break and two second broken lines respectively located at two ends of the second break.

* * * * *